(12) United States Patent
Valdyanathan et al.

(10) Patent No.: US 9,619,800 B1
(45) Date of Patent: *Apr. 11, 2017

(54) SYSTEMS AND METHODS FOR PROCESSING TRANSACTIONS

(75) Inventors: Geetha Valdyanathan, Landenburg, PA (US); Thomas C. Barton, Newark, DE (US); Lee Knackstedt, Bear, DE (US); Scott W. Rau, Pottstown, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 1173 days.

This patent is subject to a terminal disclaimer.

(21) Appl. No.: 12/828,882

(22) Filed: Jul. 1, 2010

Related U.S. Application Data

(63) Continuation-in-part of application No. 11/562,100, filed on Nov. 21, 2006, which is a continuation-in-part of application No. 09/630,595, filed on Aug. 1, 2000.

(60) Provisional application No. 61/239,334, filed on Sep. 2, 2009.

(51) Int. Cl.
*G06Q 40/00* (2012.01)
*G06Q 20/40* (2012.01)
*G06Q 20/38* (2012.01)

(52) U.S. Cl.
CPC ........... *G06Q 20/40* (2013.01); *G06Q 20/385* (2013.01)

(58) Field of Classification Search
CPC ...... G06Q 20/40; G06Q 20/385; G06Q 40/00; G06Q 40/02

USPC ...... 705/17, 64, 65, 67, 68, 70, 78; 235/379, 235/380
See application file for complete search history.

(56) References Cited

U.S. PATENT DOCUMENTS

| | | | | |
|---|---|---|---|---|
| 5,317,636 | A * | 5/1994 | Vizcaino | 705/65 |
| 5,790,677 | A * | 8/1998 | Fox et al. | 705/78 |
| 5,940,510 | A * | 8/1999 | Curry et al. | 705/65 |
| 5,999,624 | A * | 12/1999 | Hopkins | 705/70 |
| 6,039,249 | A * | 3/2000 | Szewczykowski | 235/379 |
| 6,874,104 | B1 * | 3/2005 | Josten et al. | 714/15 |
| 2002/0174062 | A1 * | 11/2002 | Sines et al. | 705/39 |
| 2008/0195549 | A1 * | 8/2008 | Phillips | 705/64 |

* cited by examiner

*Primary Examiner* — Kirsten Apple
*Assistant Examiner* — Michael W Anderson
(74) *Attorney, Agent, or Firm* — Hunton & Williams LLP

(57) ABSTRACT

A system and method that keeps check of financial transactions by maintaining distinct records for a plurality of devices associated with a financial account, in conjunction with performing authentication further to inputting transaction data from a point of sale, the system comprising a communication portion that inputs transaction data received from the point of sale, the transaction data including an account number and one of a CVV number and an expiration date; a device identification portion that identifies a particular device, from which the transaction originated, out of the plurality of devices based on the account number and one of the CVV number and the expiration date; and an authentication portion that performs authentication processing based on a comparison process that utilizes the transaction data, the authentication portion generating an authentication result, and the authentication portion outputting the authentication result. Other transaction data may be used in lieu of the one of a CVV number and an expiration date.

18 Claims, 17 Drawing Sheets

Fig. 10

| Rank of Attribute | Attribute Type |
|---|---|
| 1 | Account number |
| 2 | CVV Number |
| 3 | CVV2 Number |
| 4 | Payment device differentiator number |
| 5 | Payment device expiration date |
| 6 | Channel on which payment device is operable |
| 7 | Version of software disposed on payment device |
| 8 | Merchant types allowed |
| 9 | Time of day allowed (time windows) |
| 10 | Locations allowed (zip code) |
| 11 | History including frequency parameters |
| 12 | Point system data |
| 13 | Expiration date data |
| 14 | Hash information |

232 Attribute rank table

Fig. 11

| Attribute Type (called out in transaction data) | Attribute particulars |
|---|---|
| Account number | 1234 1234 1234 7777 |
| CVV number | 746 |
| Merchant type | Type 5567 |

234 generated "transaction data record"

(generated based on data received with the transaction request)

Fig. 12

| Attribute Type | Attribute particulars |
|---|---|
| Account number | 1234 1234 1234 7777 |
| CVV Number | 746 |
| CVV2 Number | None |
| Payment device differentiator number | 1234.4587 |
| Payment device expiration date | 01/2012 |
| Channel on which payment device is operable | Any |
| Version of software disposed on payment device | PAY567494-1234 |
| Merchant types allowed | Type 5567 only |
| Time of day allowed (time windows) | 7am - 11pm |
| Locations allowed (zip code) | 18801, 18822 |

236 payment device record

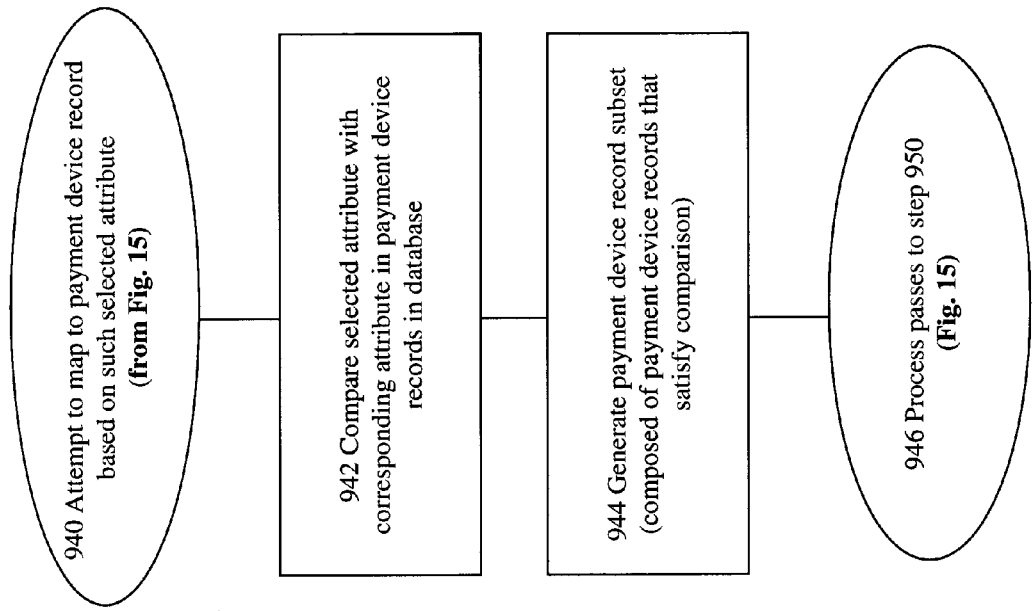

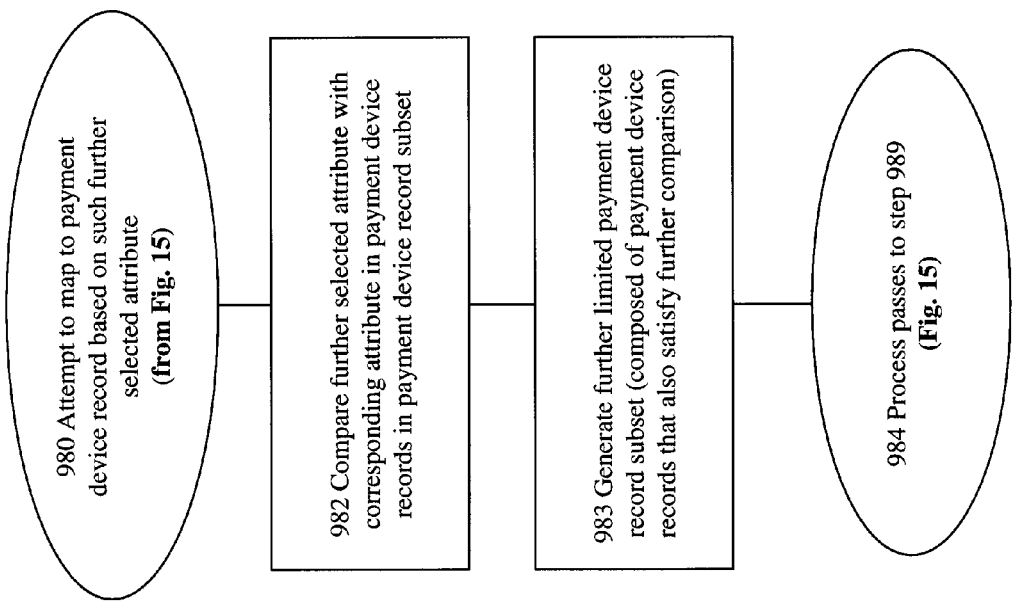

SYSTEMS AND METHODS FOR PROCESSING TRANSACTIONS

RELATED APPLICATIONS

This application is a Continuation-in-Part application of U.S. application Ser. No. 11/562,100 filed Nov. 21, 2006, which is a Continuation-in-Part application of U.S. application Ser. No. 09/630,595 filed Aug. 1, 2000, both of such applications incorporated herein by reference in their entirety.

This application also claims priority to provisional U.S. Application Ser. No. 61/239,334 filed Sep. 2, 2009, which is incorporated herein by reference in its entirety.

FIELD OF THE INVENTION

The systems and methods of the invention relate to keeping check of financial transactions, in conjunction with performing authentication of the transaction.

BACKGROUND OF THE INVENTION

Standard credit cards and other transaction accounts have a Primary Account Number (PAN) which is typically the 16 digit number on the card. In the case of accounts having multiple cards, (e.g., a credit card having PAN xxxx xxxx xxxx xxxx with husband and wife each having a card), each of the multiple cards is the same. However, authentication processing may be complicated by both a husband and wife (or any other multiplicity of persons) using multiple cards off one PAN.

The invention addresses the above problem, as well as other problems, that exist in known technology.

SUMMARY OF THE INVENTION

A system and method that keeps check of financial transactions by maintaining distinct records for a plurality of devices associated with a financial account, in conjunction with performing authentication further to inputting transaction data from a point of sale, the system comprising a communication portion that inputs transaction data received from the point of sale, the transaction data including an account number and one of a CVV number and an expiration date; a device identification portion that identifies a particular device, from which the transaction originated, out of the plurality of devices based on the account number and one of the CVV number and the expiration date; and an authentication portion that performs authentication processing based on a comparison process that utilizes the transaction data, the authentication portion generating an authentication result, and the authentication portion outputting the authentication result. Other transaction data may be used in lieu of the one of a CVV number and an expiration date.

BRIEF DESCRIPTION OF THE DRAWINGS

The invention can be more fully understood by reading the following detailed description together with the accompanying drawings, in which like reference indicators are used to designate like elements, and in which:

FIG. 10 shows an attribute rank table illustratively showing the rank of various attribute types, in accordance with one embodiment of the invention.

FIG. 11 shows a generated transaction data record in accordance with one embodiment of the invention.

FIG. 12 shows a payment device record in accordance with one embodiment of the invention.

FIG. 16 is a flowchart showing in further detail the "attempt to map to a payment device record based on the selected attribute" step of FIG. 15, in accordance with one embodiment of the invention.

FIG. 17 is a flowchart showing the "attempt to map to payment device record based on such further selected attribute" step of FIG. 15, in accordance with one embodiment of the invention.

DETAILED DESCRIPTION OF PREFERRED EMBODIMENTS

Figure 1:
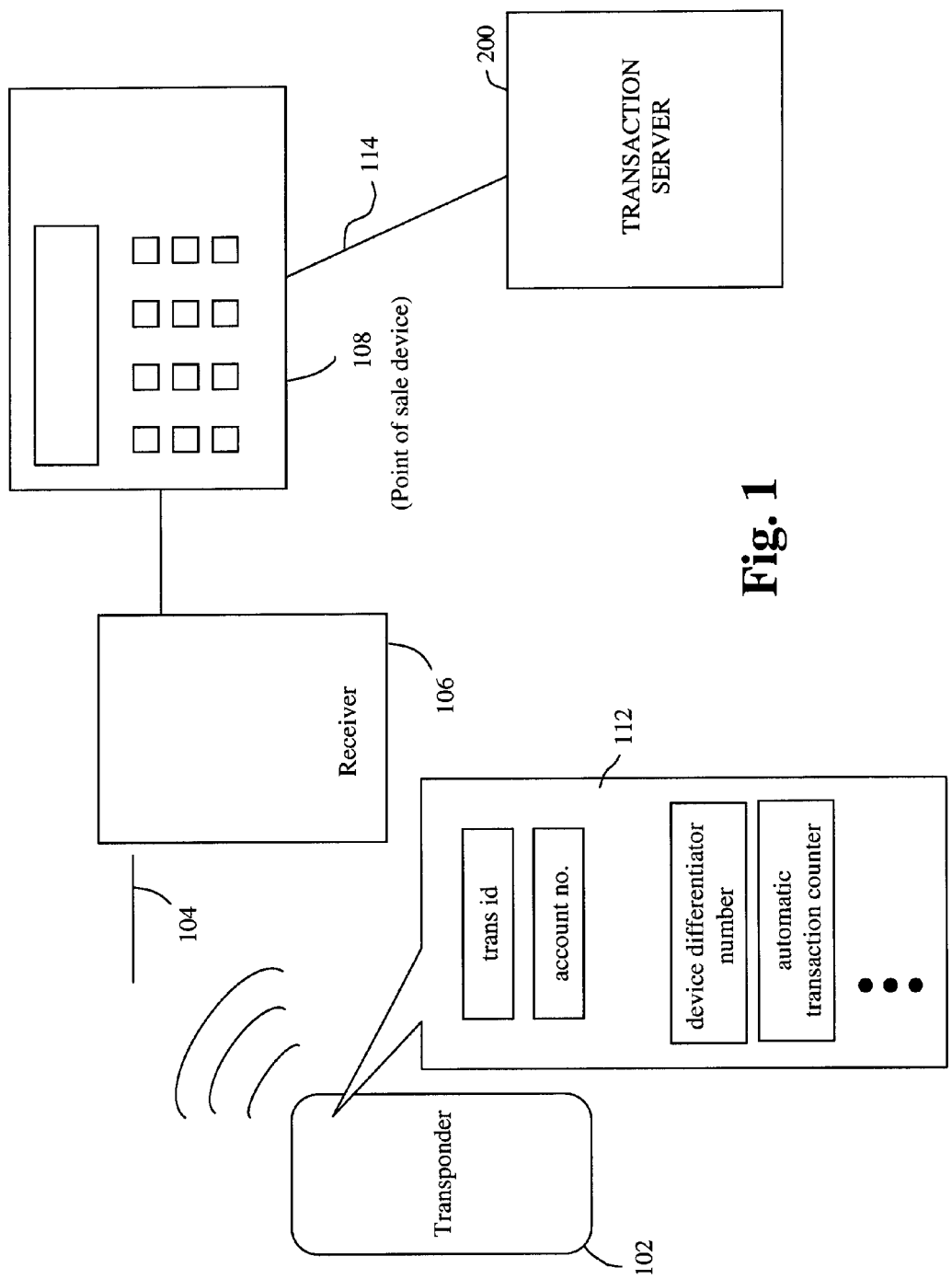
FIG. 1 illustrates an overall transaction architecture according to one embodiment of the invention.

Hereinafter, aspects of methods and systems in accordance with various embodiments of the invention will be described. As used herein, any term in the singular may be interpreted to be in the plural, and alternatively, any term in the plural may be interpreted to be in the singular.

Features of various embodiments of the invention are described herein. The invention relates to utilization of a payment device in a transaction processing system. The payment device may be any of a variety of devices. The invention relates to identification of the particular payment device used in a transaction and processing associated with such identification. For example, the payment device may be a credit card, debit card, a smart card, RFID card, other funds card, a special device for effecting internet purchases, a program operating on a computer system, a key FOB, a device with a bar code, a phone, a device in a keychain, a processing component in an personal music device and/or any other payment device that is used by a user to effect a transaction. For example, the payment device may be a software applet running on the user's computer, which allows access to the user's account. Further, the particular payment device may utilize a variety of technologies to interface with other portions of the transaction processing system. Such interface used by the payment device may include magnetic stripe technology, wireless technology and/or a computer network, for example. For example, as described below in accordance with one embodiment, the invention might utilize RF or RFID technology as an interface between the payment device and the other transaction processing system components. Accordingly, various embodiments of the invention may utilize a variety of systems with differing architecture.

Accordingly, the invention is directed to providing differentiation between such multiple payment devices in the field. In short, any device might be utilized to function as a payment device so long as such device provides information needed to process a transaction, or so long as a customer can transmit the information using the device. However, it is appreciated that the architecture of the transaction processing system, including the payment devices, should preferably be sustained on a global network, i.e., to support global capabilities.

In accordance with one embodiment of the invention, hereinafter features of the invention relating to credit card processing will be described. In running a transaction for a credit card, for example, the card reader typically reads (1) the PAN, (2) expiration date of the card, and (3) discretionary data, for example. All of such information may be read using any suitable reader. The discretionary data may include an ATC (Automatic Transaction Counter) which increments for each new transaction. When the cardholder runs a new transaction, the ATC is read and then compared to an ATC value, when an ATC value is maintained by the authentication platform of the card processor, i.e., when a counter is maintained. If respective derived values, i.e., values derived from the ATC values, do not match, then the transaction is denied. This processing prevents fraud by a person who somehow reads (or otherwise acquires) the PAN and expiration date. Accordingly, the person attempting the transaction needs the ATC counter to run a transaction. As used herein, ATC may be constituted by an "Automatic Transaction Counter" (as noted above) as well as constituted by what might be characterized as an "authorization transaction counter" and/or an "activity transaction counter".

A problem in the "multiple cards per PAN" scenario is that each card will have a different ATC (Automatic Transaction Counter) count. For example, the husband may have an ATC value of 10 transactions on his card, and the wife has an ATC value of 25 transactions on her card. Both cards are tied to the same PAN account. If the card processor has an ATC value of 25 (the wife's value) for the shared PAN, and the husband uses his card which has an ATC of 10, obviously the husband's transaction will not go through. The problem is how does the processor in the authentication platform distinguish between the different cards for the PAN? One solution is to issue a different PAN for each payment device that is issued, e.g. one PAN for each credit card. However, this approach would result in an excessive and effectively unmanageable number of PANs. Also, such an arrangement would not allow a user to have multiple payment devices associated with a single PAN, which is often desired. Accordingly, the one PAN for each payment device is not a workable solution.

One solution is to give each separate card (or other payment device) its own unique number or some other indicia. Such unique number might be characterized as a Card Sequence Number (CSN) or a Device Differentiator Number (DDN), for example, as discussed in U.S. application Ser. No. 11/562,100, filed Nov. 21, 2006 entitled "PROCESSING TRANSACTIONS USING A REGISTER PORTION TO TRACK TRANSACTIONS", which is incorporated herein by reference in its entirety. The features of U.S. application Ser. No. 11/562,100 may be used in conjunction with the features described herein.

A further solution, in accordance with embodiments of the invention described herein relate to novel processing of data that is more routinely secured in processing of a transaction.

For example, let's assume the account (PAN) has 4 purchase devices: (1) a first credit card, (2) a second credit card, (3) a first RFID key fob, and (4) a second RFID key fob. Each of the 4 devices is given its own DDN. Each then maintains its own ATC count, and the card processor also maintains an ATC count for each separate DDN. The card processor can not only keep track of which ATC count each device is on, but can also glean substantial information by telling which particular payment device was used to effect which particular transaction.

It is appreciated that while various embodiments of the invention set forth herein include an ATC (Automatic Transaction Counter), e.g., the DDN is used in conjunction with the ATC, such is not needed. Thus, in practice of embodiments of the invention, it is not needed that a particular device utilize, or have, an ATC. For example, in embodiments, a particular device may not use an ATC, but only the DDN as described herein. Thus, the processing of the DDN may or may not be performed in conjunction with (or alongside) the processing of an ATC. As should be appreciated, the utilization of the DDN alone, i.e., without an ATC, lends itself to a wide variety of benefits.

FIG. 1 shows one architecture, in accordance with an embodiment of the invention. FIG. 1 illustrates an overall point of sale architecture that includes a transponder 102 which communicates via an RF link 104 to a receiver 106. The transponder 102 may be or include any of several known electromagnetically coupled devices, generally activated by proximity to an RF-enabled receiving unit, such as receiver 106. Transponder 102 may, for instance, contain an electromagnetic coil antenna for inductive coupling to receiver 106, thereby being energized with small but sufficient electric current to activate embedded electronics within the transponder 102. Those electronics may include memory such as CMOS memory, logic gates, filters for isolating discrete transmission frequencies and other elements known in the art. In one embodiment, transponder 102 may be programmable and able to receive updated programmable instructions via RF link 104, as well as to have electronic memory erased or updated during transactions. Receiver 106 may include an electromagnetic antenna to couple with transponder 102, generally within the range of a few feet of the device.

In the embodiment illustrated in FIG. 1, the receiver 106 is connected to a point of sale (POS) device 108 for conducting a commercial or other transaction. For instance, the point of sale device 108 may be or include any of several commercially known electronic cash registers or related transaction processing equipment, such as point of sale terminals manufactured by Sharp Corp. or others. In one embodiment of the invention, transponder 102 may be embedded within a personal article for convenience, aesthetic and affinity purposes. In that regard, the invention might be integrated in one implementation within a fully functional watch. Embedding in other personal articles, such as key chains, pagers, clothing or other items is also possible. In the operation of the invention, a user who has subscribed to the account system of the invention may approach the receiver 106 at the point of sale device 108 to initiate and complete a purchase or other transaction, such as at a restaurant or grocery market checkout line, or other points of sale. In the embodiment illustrated in FIG. 1, transponder 102 contains an encoded transponder ID 110, which may for instance be a 5-digit number or other identifying information. In this embodiment, transponder 102 may also store an account table 112 directly recording account information for the subscribed user of the transponder 102. The account table 112 may be or include, for example, an account number and other information for a debit account, a cash account, a credit card account, special premises account for internal use such as by employees, or other account information associated with users of the system. The account information in the account table may also include a device differentiator number and an automatic transaction counter (ATC) value.

In the implementation of this embodiment of the invention, receiver 106 is configured to receive the account table 112 and apply an amount being executed at the point of sale device 108 to the account reflected within the account table 112. For instance, a patron who has subscribed to an account according to the system of the invention may approach receiver 106 in a restaurant line and wave a watch or other article containing transponder 102 in proximity of the receiver 106. When transponder 102 comes within range of receiver 106, transponder 102 may be inductively coupled to the coils of an electromagnetic antenna within receiver 106 inducing electrical energy within transponder 102, to establish the RF link 104 with the receiver 106. Upon activation of transponder 102 and radiation of transponder ID 110 to the receiver 106, the receiver 106 may respond with an acknowledge signal to the transponder 102. The point of sale device 108 may indicate on a display screen or otherwise that a transaction is ready to be commenced. Once the point of sale device 108 generates total amount due for the transaction, the receiver 106 may interrogate transponder 102 to obtain account table information from account table 112 for application to the account.

For instance, if a patron has purchased a meal in a restaurant line at point of sale device 108, the total purchase price may be validated for completion of the transaction. Conversely, if the amount of the transaction cannot be validated, the point of sale device 108 may indicate "cash required" or another message that transponder validation or authorization has failed. If the transaction amount is validated, receiver 106 enters the transaction amount and transmits the revised account table 112 information over the RF link 104 to the transponder 102. A transaction completion signal may be emitted by receiver 106, which in one embodiment may turn off or decouple the transponder 102 via RF link 104.

Figure 3:
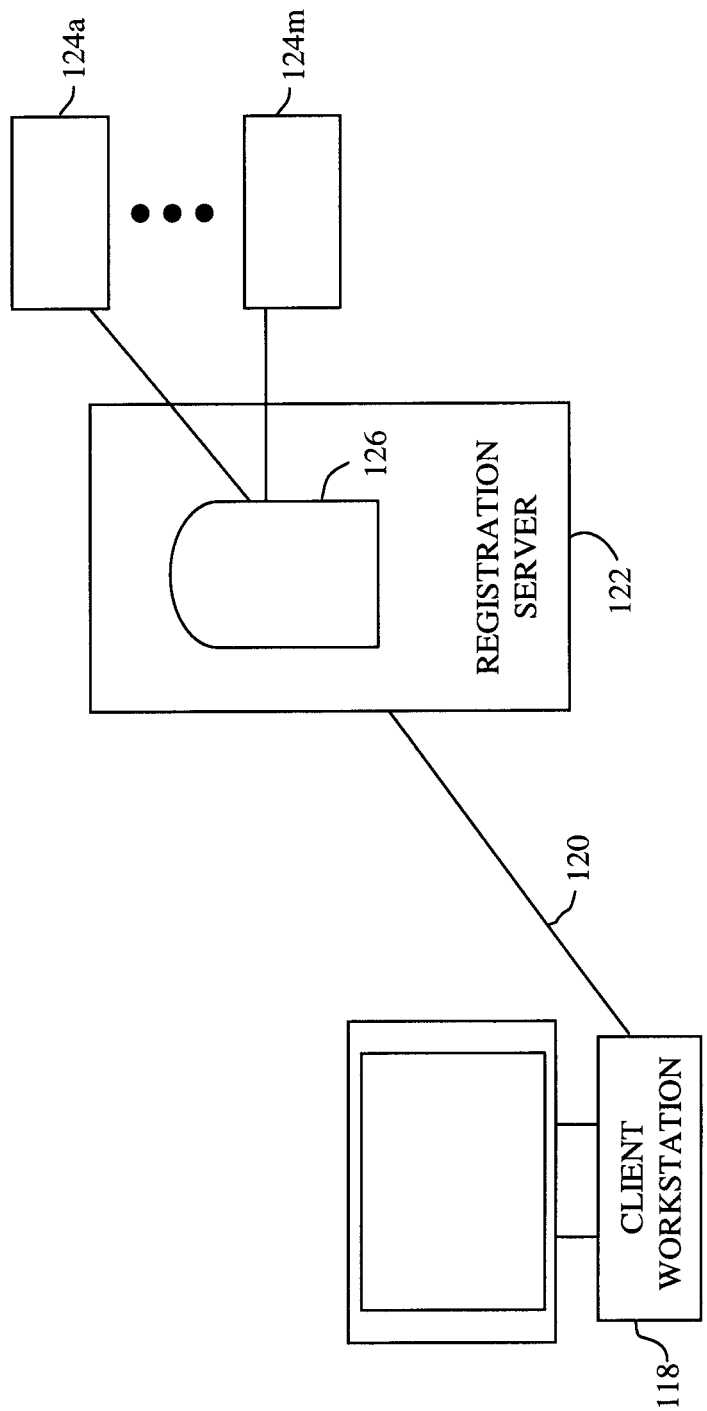
FIG. 3 illustrates an activation architecture for the initiation of user accounts according to the invention.

In terms of new accounts registration as illustrated in FIG. 3, in the invention a network-based activation architecture may be advantageously employed. As shown in the figure, a new user may access a client work station 118 connected via communications link 120 to a registration server 122. The communications link 120 may be, include or access any one or more of, for instance, the Internet, an intranet, a PAN (Personal Area Network), a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or FDDN (Fiber Distributed Data Networks) or CDDI (Copper Distributed Data Interface) connections. Communications link 120 may furthermore be, include or access any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communications link 120 may yet further be, include or access any one or more of an RS-232 serial connection, an IEEE-1394 (Firewire) connection, an IrDA (infrared) port, a SCSI (Small Computer Serial Interface) connection, a USB (Universal Serial Bus) connection or other wired or wireless, digital or analog interface or connection.

The registration server 122 may be or include, for instance, a workstation running the MicrosoftWindows™ NT™, Windows™ 2000, Unix, Linux, Xenix, IBM AIX, Hewlett-Packard UX, Novell Netware™, sun Microsystems Solaris™, OS/2™, BeOS™, Mach, Apache, OpenStep™ or other operating system or platform.

The registration server 122 may communicate with client workstation 118 to receive preassigned information related to transponder 102, such as transponder ID 110 which may be printed by sticker on a watch or other article housing the device, for entry into a database 126 within registration server 122 and the setting up of an account. The account may illustratively include or be more than one type of account 124a . . . 124n, such as cash accounts, debit accounts, credit card accounts, special purpose vending accounts, telephone card accounts, or others. The registration server 122 may validate the transponder ID 110, and interrogate a new subscriber at client work station 118 to identify or select which one or more of accounts 124a . . . 124n the user wishes to associate with the transponder 102.

For instance, the registration 122 may accept a preexisting credit card number for registration with the transponder 102 and execution of future transactions. Once new account information is established, the registration server 122 may communicate via network connection to receiver 106 to update subscriber registration tables within the database 126, receiver 106, point of sale device 108 or other associated hardware to authorize transactions at the point of sale. The paperwork, delay, possibility for error and other drawbacks of paper-based back end account registration is thereby avoided.

Figure 2:
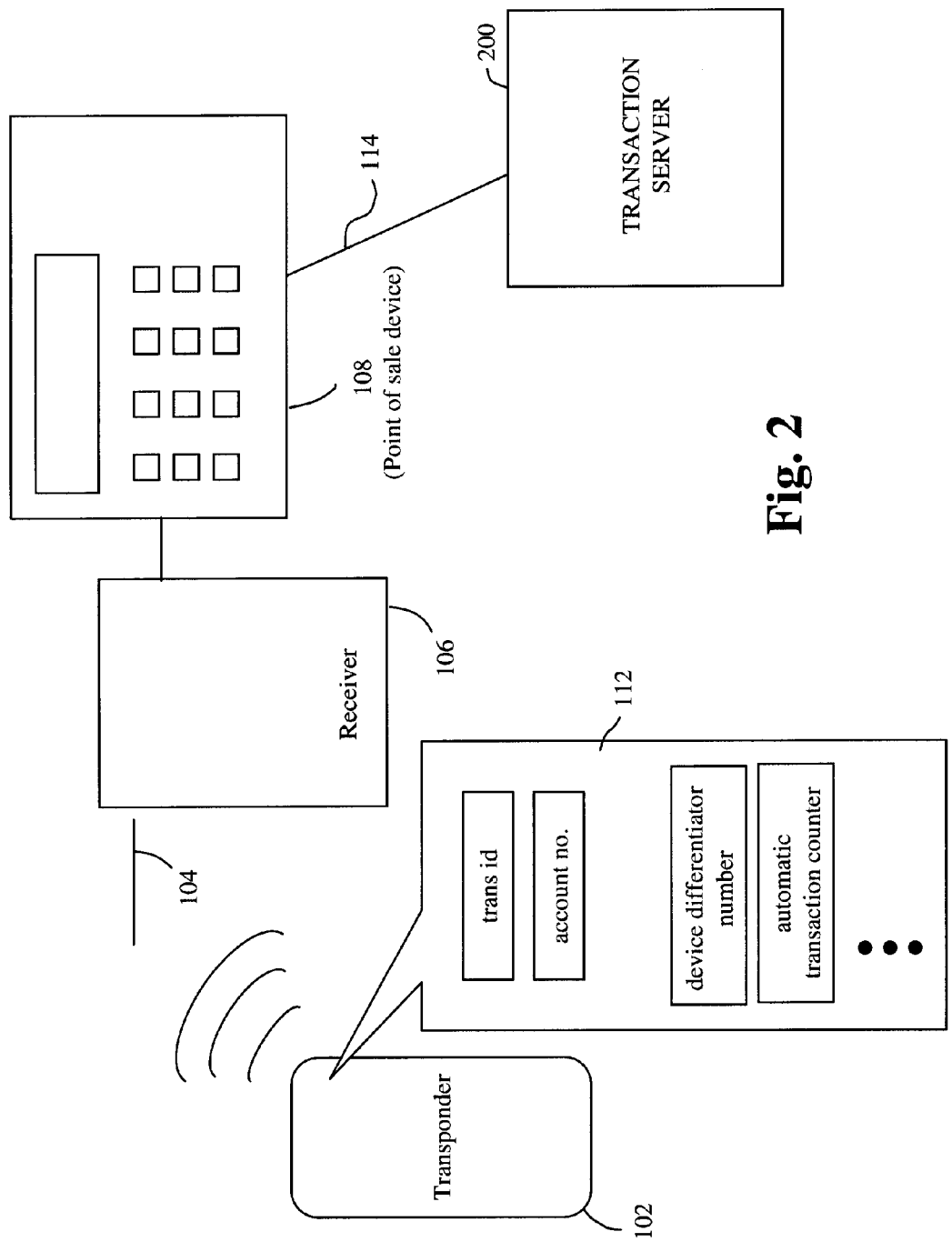
FIG. 2 illustrates an overall architecture of the invention according to a second embodiment of the invention.

A second illustrative embodiment of the invention is shown in FIG. 2, generally involving a processing architecture similar to that of FIG. 1. In this embodiment, a transponder 102 again communicates via RF link 104 with receiver 106 to effectuate point of sale or other transactions. However, in the embodiment of FIG. 2 a portion or all of account table 112 or other information stored in transponder 102 in the first embodiment may be offloaded to economize on the necessary electronics, power consumption and other properties of transponder 102. In the embodiment illustrated in FIG. 2, the point of sale device 108 is additionally connected to a transaction server 200 via communications link 114, for the purpose of authorizing in whole or in part transactions presented for payment using transponder 102. Communications link 114 may be, include or access communications resources similar to communications link 120.

In this embodiment, part or all of the information of account table 112 may be stored in hard disk or other storage 230 of transaction server 200. Transaction initiation begins in the same manner as the embodiment illustrated in FIG. 1, however, after acknowledgments are exchanged between point of sale device 108 and transponder 102 and a transaction is set up, the point of sale device 108 may communicate with transaction server 200 to validate a transaction amount or other information against account information stored in the transaction server 200.

While this implementation involves additional hardware and communications link 114, if transaction server 200 is co-located with the point of sale device 108, such as in a restaurant or retail outlet, communication delays may be minimal. Furthermore if the transaction server 200 is dedicated to processing transactions only at the site of point of sale device 108 or closely grouped facilities, processing burdens may be comparatively modest. In another embodiment of the invention, transaction server 200 may communicate with remote credit file databases or other information resources before authorizing or completing a transaction initiated over RF link 104 at receiver 106, when circumstances may permit some execution delay to be acceptable.

Alternatively, in another embodiment of the invention the point of sale device 108 may perform a preliminary authorization for transactions presented at the receiver 106, to collect and temporarily store transactions, for instance over 2 or 3 hour periods, for batch processing remotely via transaction server 200. Since the majority of transactions typically reconcile without difficulty, this implementation permits more-immediate completion while still checking on account validations at frequent intervals.

Figure 4:
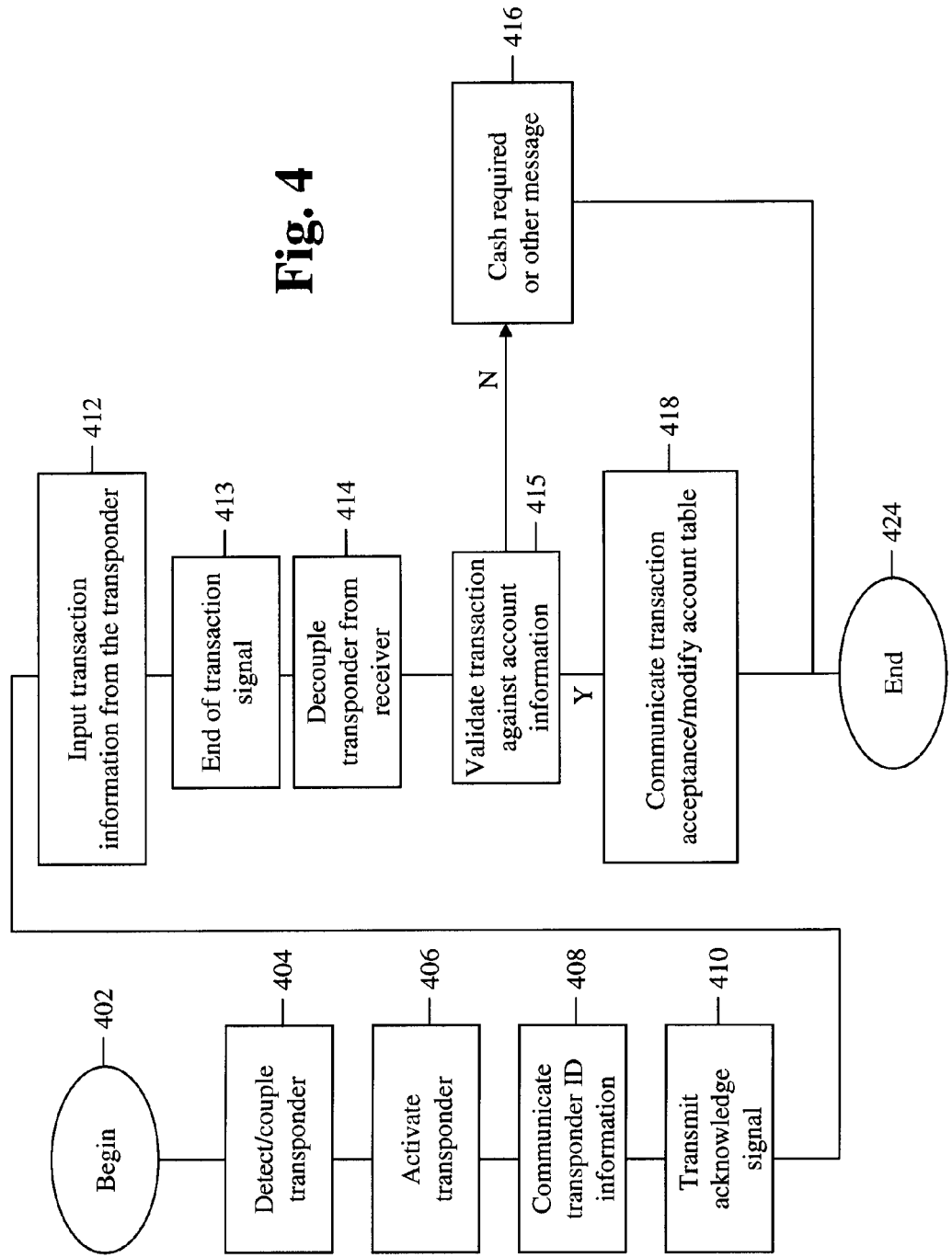
FIG. 4 illustrates a flowchart of transaction processing according to the invention.

Overall transaction processing is illustrated in the flowchart of FIG. 4. In step 402, processing begins. In step 404, the receiver 106 is presented with transponder 102 within range of electromagnetic coupling, such as inductive coupling. In step 406, transponder 102 is activated, for instance by inductive energization of its circuitry. In step 408 transponder 102 may communicate transponder ID 110, which the receiver 106 acknowledges with an acknowledge signal over RF link 104 in step 410.

In step 412, transaction information is input from the transponder. After step 412, the process passes to step 413.

In step 413, an end of transaction signal is sent to transponder 102. Then, in step 414, transponder 102 decouples from the receiver 106.

In step 415, transaction table 112 or other account information may be interrogated to determine whether account parameters permit the pending transaction at the point of sale device 108, i.e., a validation process is performed on the transaction. If the transaction is not validated, then in step 416 a "cash required" or other message is signaled at point of sale device 108, and processing proceeds to step 424 whole processing ends.

If the account to be applied to the pending transaction is validated at step 414, in step 418, the point of sale device 108 and receiver 106 communicate with transponder 102 to indicate transaction acceptance, and modify information within account table 112 if appropriate. In step 424, processing ends.

The foregoing description of the system and method for transponder-activated transactions is illustrative, and variations in configuration and implementation will occur to persons skilled in the art. For instance, while transponder 102 has been described as electromagnetically coupling with the receiver 106, or other types of detection and coupling could be used. For instance, an infrared device, a biometrically enabled or other device may be presented to corresponding detecting apparatus at the point of sale. Similarly, transponder 102 may contain or store other types or forms of information other than transponder ID 110 and account table 112.

In general, in implementation of the various embodiments of the invention, any type of arrangement may be used to transmit information from the payment device to an transaction processing system. For example, an RF or RFID interface may be used as described herein, as well as any other suitable wireless interface might be used. Other interface arrangements that might be used to communicate information between the payment device and the transaction processing system include a bar code reader, a magnetic stripe reader, a hologram reader, any other visual identifier and associated reader, a key entry device, the Internet or any other computer network, any point of sale (POS) device and/or a phone network or any other communication network or arrangement, for example.

Hereinafter, further details of the architecture and processing of the transaction server 200 will be described in accordance with embodiments of the invention. In particular, aspects of processing by the transaction server 200 relating to the device differentiator number (DDN) will be described. For example, each transponder 102 may be associated with a particular device differentiator number.

Figure 6:
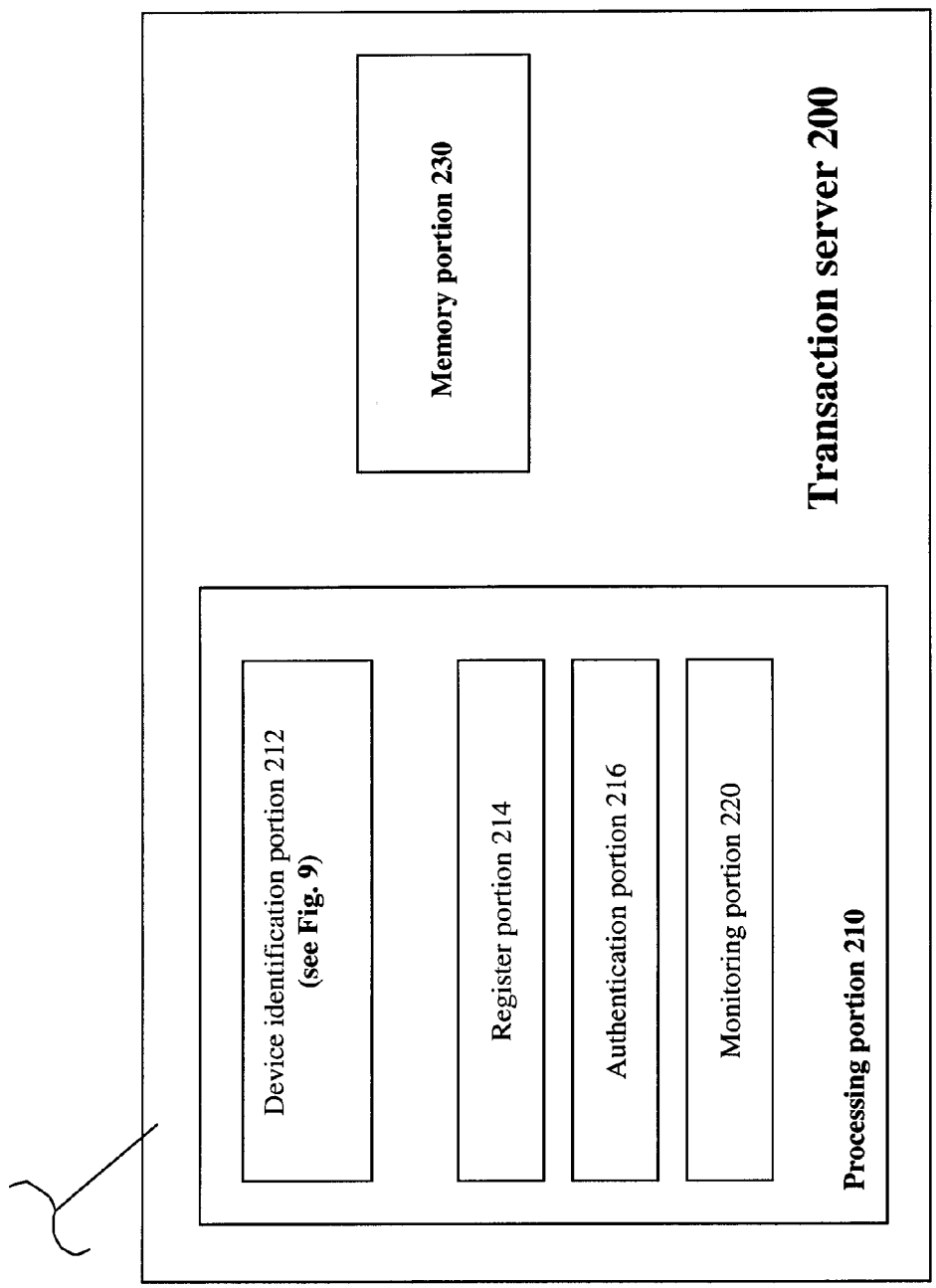
FIG. 6 is block diagram showing further details of the transaction server 200 in accordance with one embodiment of the invention.

As described herein, the transaction server 200 performs authorization processing for transactions presented for payment using transponder 102. This authorization is performed at the transaction server 200. FIG. 6 is a block diagram showing further details of the transaction server 200 in accordance with one embodiment of the invention.

As shown in FIG. 6, the transaction server 200 includes a processing portion 210. The processing portion 210 performs a variety of processing in the transaction server 200. For example, such processing is related to authorization of a requested transaction and/or monitoring of transactions, for example. The transaction server 200 further includes a memory portion 230. The memory portion 230 may be in the form of a computer readable medium. The memory portion 230 stores a wide variety of data needed in operation of the transaction server 200. Such data may relate to accounts of customers, aggregated data and/or behavior information, for example.

The processing portion 210 includes a number of processing components. Specifically, the processing portion 210 includes a device identification portion 212, a register portion 214 and an authentication portion 216, as well as a monitoring portion 220.

The various processing performed by the components in the processing portion 210 are discussed further below. However, in summary, the device identification portion 212 identifies the device that is associated with a particular requested transaction. The register portion register portion 214 in turn identifies the transaction count value for the particular requested transaction. The authentication portion 216 works in conjunction with the device identification portion 212 and the authentication portion 216 to effect the authentication of the requested transaction. The processing portion 210 also includes the monitoring portion 220. The monitoring portion 220 analyzes data acquired (from the various transactions that are processed by the transaction server 200) for a variety of purposes. For example, the monitoring portion 220 analyzes the data to identify behavior and to prevent fraud.

Hereinafter, further aspects of the invention will be described relating to the use of device differentiator numbers and transaction count values, as well as the associated processing of the transaction server.

Transactions processed by the system of FIG. 1 are typically associated with a transaction account. As described herein, transaction accounts have a Primary Account Number (PAN) which is typically the 16 digit number on the card. In the case of accounts having multiple payment devices, (e.g., credit cards having PAN xxxx xxxx xxxx xxxx with husband and wife each having a respective card), each of the multiple cards is the same. However, authentication processing may be complicated by both a husband and wife (or any other multiplicity of persons) using multiple cards off one PAN. Illustratively, this is true in the situation where a counter is utilized to authenticate transactions associated with the card.

This also becomes a problem in the context of RFID (Radio Frequency IDentification) based cards like the Chase Blink Card, i.e., the Chase card with Blink. The Blink Card is one embodiment of the transponder 102 of FIG. 1. The Blink Card has a magnetic stripe for magnetic stripe processing, as well as an RFID chip for RFID based processing (where one just waves the card past an RFID capable reader). For those RFID based transactions, for example, the card reader (e.g. the receiver 106 of FIG. 1) reads (1) the PAN, (2) expiration date, and (3) discretionary data. All of (1)-(3) are read using the RFID reader off the RFID chip.

The discretionary data may include an ATC (Automatic Transaction Counter) which increments for each new transaction. When the cardholder runs a new RFID transaction, the ATC is read and then compared to an ATC value maintained by the card processor (e.g. JP Morgan Chase's authentication platform). If the derived values do not match, then the transaction is denied. This prevents fraud by a person who somehow reads (or otherwise acquires) the PAN and expiration data.

The problem is that in the multiple cards per PAN scenario, each card will have a different ATC count as those cards are used differently. For example, the husband may have an ATC value of 10 on the husband's card (as a result of making 10 transactions), and the wife has an ATC value of 25 on her card (as a result of making 25 transactions). Both cards are tied to the same PAN account. If the card processor has an ATC value of 25 (my wife's value) for our PAN, and I use my card which has an ATC of 10, obviously my transaction will not go through. The problem is how does the processor distinguish between the different cards for the PAN? In accordance with embodiments of the invention, the solution is to give each separate card its own device differentiator number (DDN), e.g., let's assume the account (PAN) has 4 purchase devices: (1) a first Blink card, (2) a second Blink card, (3) a first RFID key fob, and (4) a second RFID key fob. Each of the 4 devices is given its own DDN. Each then maintains its own ATC count, and the card processor also maintains an ATC count for each separate DDN. For example, each DDN may be stored on several bytes on the card and can be a value between 1-9, for example, to allow up to 9 different cards/fobs (or other devices) for the single PAN. It could be just 3 bits, which would allow up to 8 different values for 8 different cards/fobs or other devices. However, any suitable storage medium might be used (of any suitable size) to store the device differentiator number (DDN). For example, more than 9 values might be needed or desired, i.e., any number of values may be provided for, as desired. In general, any suitable number might be used to differentiate a particular payment device. For example, a numbering scheme might be used to uniquely identify the particular payment device, as well as to reflect that the particular payment device is a member of a family of payment devices. For example, the number of payment devices associated with a particular PAN might be reflected in the device differentiator number.

In one embodiment, the discretionary data (3) that is read off the card according to the invention includes (a) the DDN value, and (b) the ATC value. As a result, the authentication platform (based on the DDN) can identify which device was used to run the transaction. In particular, in the transaction server 200 of FIG. 6, the device identification portion 212 performs this identification. Accordingly, the authentication platform, and specifically the register portion 214 of FIG. 6, will know which ATC value that particular device is on (since the authentication platform retains the last counter it saw from that particular device, for example). In accordance with embodiments of the invention, the device differentiator number (DDN) (assigned to each separate payment device) might be characterized as a static portion, whereas the ATC is the dynamic portion. Once the transaction count value is known for the particular device, based on the device differentiator number, the authentication portion 216 performs authentication processing to determine if the requested transaction should be approved.

The solution to the ATC/multiple cards problem provided by the invention has various other significant benefits. One benefit is that the Digital Authentication Code (DAC) security mechanism can be used.

When the cardholder uses the card in its RFID mode, a DAC may be utilized and is computed by using a card-specific encryption key to compute a code result based on the ATC value read off the card, and a challenge value issued by the RFID card reader. (The computation of the DAC, which is similar to a hash or message authentication code, may also factor in the PAN and expiration date.) The DAC concept is described in U.S. Pat. No. 6,857,566 and U.S. Publication No. 2005/0121512 (continuation of the '566 patent), both incorporated herein by reference in their entirety. However, since the DAC works off the ATC value of a particular card or device, utilization of the DAC has been problematic in the multiple users/one PAN situation. However, with each card having its own device differentiator number (DDN) in accord with the invention, the authentication platform can discern between different cards or devices, for example. Accordingly, the authentication platform can determine the parameters upon which the DAC was computed, and in particular, the ATC that was used to compute the DAC. It is of course appreciated that DAC processing, or DAC related processing, is certainly not needed in practice of the invention. Rather, any of a variety of authentication processing might be used. It should further be appreciated that the features described herein may also be used in conjunction with a variety of other technologies. For example, it should be appreciated that the features described herein may also be used in conjunction with any of the features described in U.S. Pat. No. 7,591,416 entitled "Selectable multi-purpose card" and/or U.S. Pat. No. 6,535,855 entitled "Push banking system and method", both incorporated herein by reference in their entirety.

Other benefits of the invention flow from utilization of a respective DDN (assigned to each card/device), and the resulting ability to identify which device effected which transaction. A variety of these benefits may be provided in conjunction with using, or processing, the ATC. For example, through use of a DDN assigned to each separate payment device, the monitoring portion 220 of the transaction server 200 can track statistics on purchasing behavior of each separate cardholder (me versus my wife). In this manner, the device differentiator number (DDN) allows the monitoring portion 220 to granulate purchasing trends amongst various persons having the same PAN.

The DDN can further be used for Point of Sale (POS) loyalty purposes. Even though a husband and wife have the same PAN (i.e., plastic number), the monitoring portion 220 can tell that the wife consistently shops at TIFFANY&Co. (versus other comparables), but that the husband shops at a variety of comparable stores. This in turn may allow for more effective target marketing.

Utilization of the device differentiator number (DDN) can be used in fraud analysis by the monitoring portion 220. For example, if a husband and wife are respectively shopping in New York and LA, the card processor can distinguish between the two cards and legitimatize the transactions.

Utilization of the device differentiator number (DDN) can assist in channel specific authorization, i.e., by the authentication platform (the authentication portion 216) being able to tell which device ran the transaction. For example, a particular PAN might be associated with two payment devices, (1) a credit card with CVV and (2) a cell phone. The authentication portion 216 might be presented with an Internet transaction in which a CVV was presented to the on-line merchant. However, the authentication platform can ascertain whether the transaction was effected by the credit card or the cell phone. If by the cell phone, the authentication platform will know the transaction is fraudulent, i.e., since the cell phone has no CVV associated with it.

As used herein, the term "CVV", "CVV2" and similar terms mean a "code verification value" that is typically physically displayed on a card of a customer and/or contained in electronic form, such as in a magnetic stripe, in the card of the customer. The code verification value is typically used to validate card information during an authorization process for the card, such as in conjunction with a transaction. The code verification value may be calculated and/or generated using a cryptographic process, for example. The CVV or CVV2 can be alpha-numeric or any other string of characters.

Further, a particular payment device may indeed have two device differentiator numbers (DDNs). For example, the Blink Card noted herein may have a DDN associated with the magnetic stripe and a DDN associated with RFID chip. As a result, the card processor (JP Morgan Chase) can tell which part of the Blink Card was used in which transaction. This allows various analysis helpful for marketing purposes, e.g., a determination that the RFID part of the Blink card is extensively used for some transactions.

Figure 5:
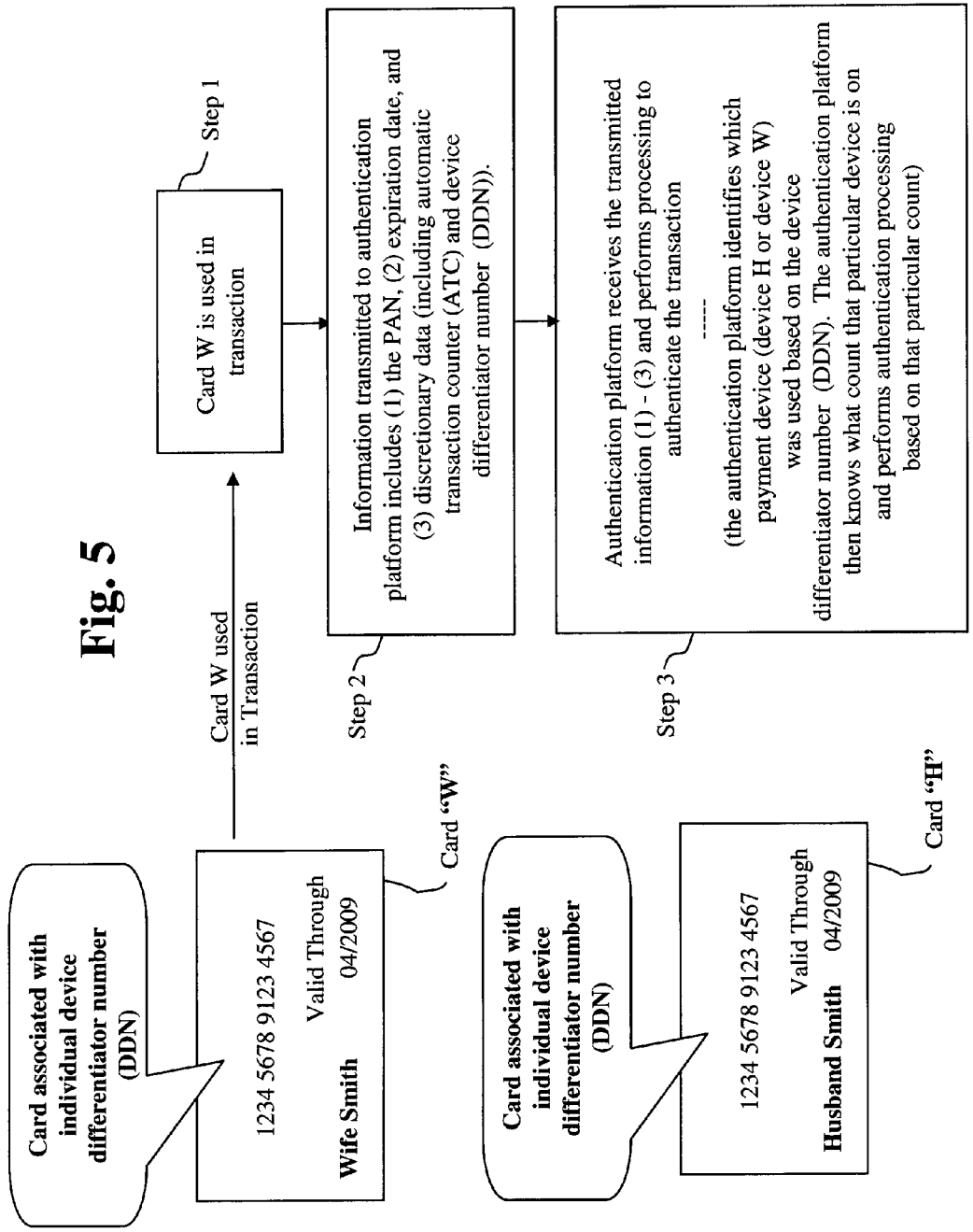
FIG. 5 is a diagram showing a validation process utilizing a respective device differentiator number (DDN), assigned to each card, in accordance with one embodiment of the invention.

FIG. 5 is a diagram showing a validation process utilizing a respective device differentiator number (DDN), assigned to each card, in accordance with one embodiment of the invention. As shown, both husband and wife (Husband Smith and Wife Smith) have their own physical card. Both cards have the same PAN. However, both cards have their own individual device differentiator number (DDN). The diagram illustrates the wife using her card in a transaction, as shown in step 1. After step 1, the process of FIG. 5 passes to step 2.

In step 2, information is transmitted to the authentication platform including (1) the PAN, (2) expiration date, and (3) discretionary data. The discretionary data includes an automatic transaction counter (ATC) and a device differentiator number (DDN).

After step 2, the process passes to step 3. In step 3, the authentication platform receives the transmitted information (1)-(3) and performs processing to authenticate the transaction. Specifically, the authentication platform first identifies which payment device (card H or card W) was used based on the device differentiator number (DDN), i.e., in this case, the authentication platform determines that card W was used. The authentication platform then determines what count (automatic transaction counter) that particular device is on and performs authentication processing based on that particular count. The process then ends with the authentication determination being transmitted back to the merchant, for example.

As described herein, a variety of processing and/or analysis can be performed using the device differentiator number (DDN), in addition to the authentication of the transaction. As an alternative to ATC (Automatic Transaction Counter), other authentication techniques may of course be used, e.g. such as time based authentication. However, the device differentiator number (DDN) described herein may well be used in the situation where the device differentiator number (DDN) is not needed for authentication, i.e., for the various other benefits as described herein.

As described in various embodiments herein, a device differentiator number is used to identify a particular payment device in the field. In such embodiments, further features may be implemented that apply particular rules to the authorization processing associated with a payment device.

In accordance with one embodiment of the invention, different rules may be applied to different devices associated with a particular PAN. Use of a particular payment device associated with a PAN may thus be controlled vis-à-vis another payment device associated with the same PAN. For example, the rules may limit which device may be used at which merchant or which type of merchant. Thus, a primary user of a first payment device associated with a PAN may have unlimited use of the PAN. However, the rules associated with a second payment device (provided to an assistant of the primary user) might only allow the assistant to shop at office supply stores, for example. This processing controlling which payment device may be used at which merchants may work off of existing merchant category codes (MCCs), for example, i.e., to determine at which store a customer is shopping. The rules associated with various payment devices (which are associated with the same PAN) may be varied as desired. Rules may hold for all the payment devices associated with a particular PAN, or alternatively, particular rules may apply to only some of the payment devices associated with a particular PAN. In accordance with some embodiments of the invention, the rules as described herein may be in the form of a "filter". For example, such filter may dictate that a card is usable at certain merchant types, only usable over a particular channel, and/or dictate other exclusions imposed on use of the particular card. Such filter might be imposed at the merchant, at the transaction server 200, and/or at another processing component or point in the transaction. It is of course appreciated that various other fraud prevention mechanisms may be used in conjunction with such rules and/or filters, including known fraud prevention mechanisms.

In accordance with one embodiment of the invention, the rules associated with respective payment devices may differentially control the time of day that the particular payment device is usable. Further, the rules may control the amount of funds that are drawn using a particular payment device. For example, an assistant of the main cardholder is only allowed to spend $500 per day.

As described herein, the rules associated with a particular device may provide channel control. That is, a particular device may only be usable via a particular channel or channels. Accordingly, a transaction is denied if a request for the transaction comes through on a channel on which the particular device cannot operate. For example, if a Blink enabled device submits a request via an Internet channel, the rules might dictate for the transaction processing system to decline that transaction (the assumption being that the transaction is fraudulent). The rules controlling the channel control may be varied as desired.

Related to the channel control, in accordance with one embodiment of the invention, an alert system may be used in conjunction with excessive denials associated with the channel control. That is, the transaction processing system may watch for a high rate of denials on a particular channel. Such a high rate of failure may be indicative that indeed such requested transactions are not fraudulent. For example, a new technology might have come on-line which allows a particular payment device to operate on a channel that was previously not possible. The authentication system might then be adjusted to legitimize such transactions.

In accordance with embodiments of the invention, trend tracking is provided to track use of a particular payment device. For example, a user might always have used a payment device on a particular channel. Accordingly, the transaction processing system may be provided to identify a change in the normal channel used by a payment device. Any of a wide variety of other trend tracking capabilities may be utilized based on the capability to distinguish between different payment devices.

Further, an alert system may be used that tracks a particular payment device for particular criteria. The particular criteria to trigger the alert, as well as the manner in which the alert is reported out, may be varied as desired. For example, if a child spends more than $50 in a day (using the child's payment device), the parent might be alerted via a cell phone call. Alternatively, the parent might be suitably alerted if the child shops at a particular type of merchant, e.g. a liquor store.

Figure 7:
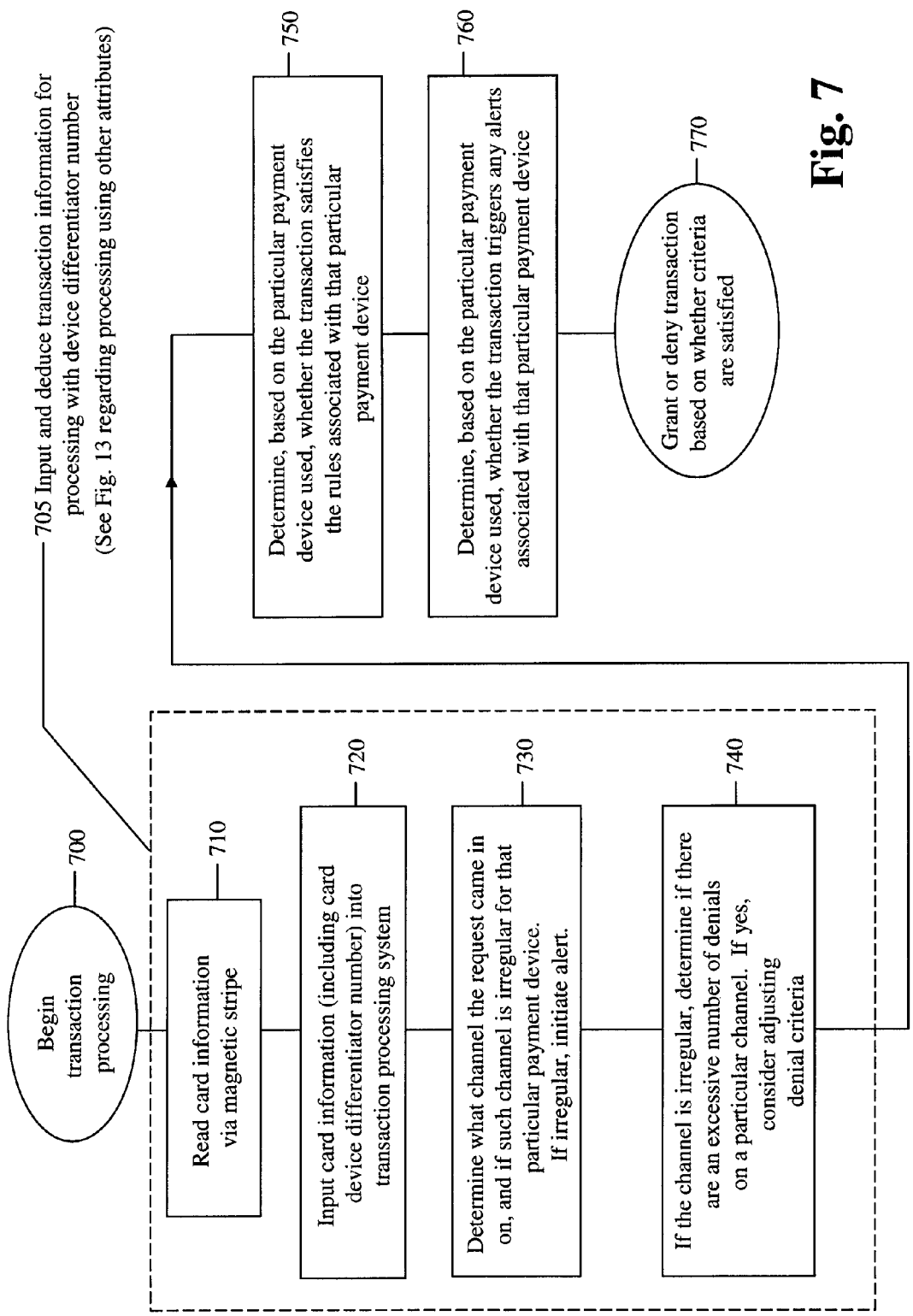
FIG. 7 is a flow chart showing further aspects of transaction processing in accordance with one embodiment of the invention.

FIG. 7 is a flow chart showing further aspects of transaction processing in accordance with one embodiment of the invention. In particular, FIG. 7 shows aspects of channel monitoring in accordance with one embodiment of the invention. As shown, the process starts in step 700 and passes to step 710. In step 710, in this example, the card information is read via a magnetic stripe. In step 720 the card information (including the DDN) is input into the transaction processing system.

In step 730 the particular channel that the request came in on is determined. Further, the process determines if such channel is irregular for that particular payment device. If it is indeed an irregular channel, an alert is initiated. The alert might be in the form of a call to the customer home number. For example, if the transaction request was for an Internet purchase (and the submitted DDN is associated with a device that cannot do Internet transactions), then an alert would be initiated.

After step 730, the process passes to step 740. In step 740, if the channel is irregular, the process determines if there are an excessive number of denials on a particular channel. If yes, the process considers adjusting the denial criteria. That is, it might be the case that new technology has come to market that provides use of a device on a new channel, i.e., a channel which was not previously usable by the particular device. By monitoring excessive denials on a particular channel and/or for a particular device type, the use of such new technology by a customer might be identified, and the system adjusted appropriately.

After step 740 of FIG. 7, the process passes to step 750. In step 750, the process determines, based on the particular payment device used (as identified by the DDN), whether the transaction satisfies any rules associated with that particular payment device. Then, in step 760, the process determines, based on the particular payment device used, whether the transaction triggers any alerts associated with that particular payment device. For example, the DDN might be associated with the daughter's credit card, and once a dollar amount is attained, an alert is sent to the parent's. In step 770, the process grants or denies the transaction based on whether criteria are satisfied, i.e., is the request authorized Hereinafter, further aspects of embodiments will be described. As described herein, discretionary data may include an ATC (Automatic Transaction Counter) which increments for each new transaction. It is appreciated that the ATC of a particular payment device may be inadvertently incremented so as to be out of synchrony with the transaction processing system (and the authentication performed thereby). For example, a payment device may be inadvertently read or energized so as to inadvertently increment the ATC of such payment device. Accordingly, the transaction processing system may be provided with a processing capability to accommodate such inadvertent incrementation of the ATC. For example, if an ATC value for a transaction is not valid, the transaction processing system might look ahead, i.e., increment, several values to determine if such ATC values might result in validation of the transaction.

Figure 8:
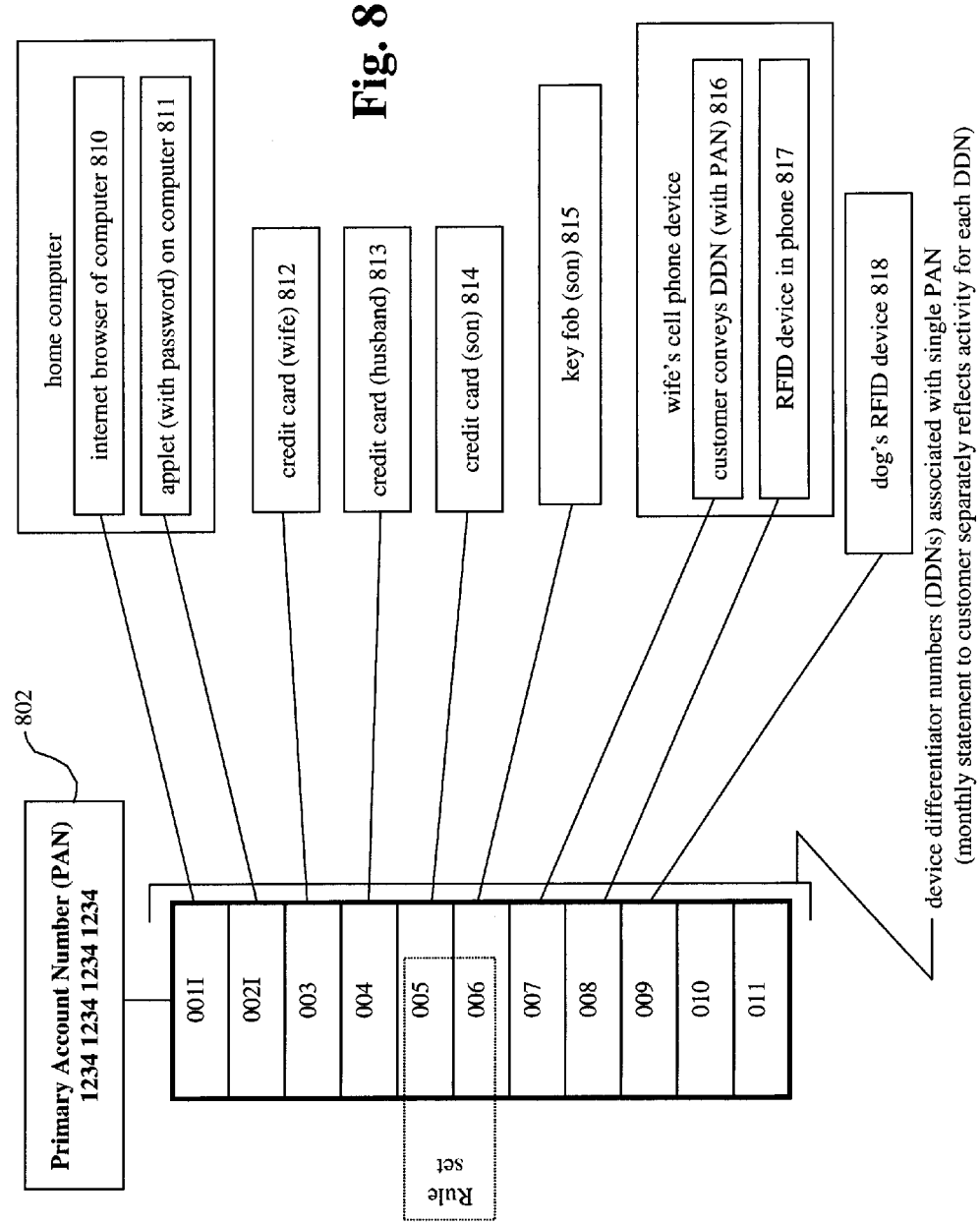
FIG. 8 is diagram showing use of multiple device differentiator numbers with one PAN in accordance with one embodiment of the invention.

In summary of aspects of the invention, and in explanation of yet further features, FIG. 8 is diagram showing use of multiple device differentiator numbers with one PAN in accordance with one embodiment of the invention.

As illustrated in FIG. 8, one PAN 802 is associated with a plurality of devices (810-818), i.e., any of the devices (810-818) may be used by the customer (or the customer's family) to access funds in the PAN account. This association is accomplished using a respective device differentiator number for each device (810-818). In requesting a transaction, the device differentiator number (associated with the particular device used) is sent to the authenticating entity along with the ATC (Automatic Transaction Counter) for the particular device. Typically, the PAN is also forwarded with a transaction request. As described in detail above, based on the PAN and the DDN submitted, the authenticating entity determines whether the ATC (also submitted) is valid. Accordingly, in accordance with one embodiment of the invention, any of a wide variety of devices may be used so long as such devices may provide the ATC, the DDN and the PAN values (or information by which the ATC, the DDN and the PAN are derivable). However, as described herein, devices that do not use an ATC may also be utilized, i.e., so as to realize the various benefits associated with use of a DDN, without an ATC.

For example, as described above, typically, the PAN is also forwarded with a transaction request. However, this may not always be the case. For example, the PAN might be somehow suitably derived from other information contained in the request. For example, a single PAN might be associated with a particular phone number, and thus derivable by the authenticating entity based on the phone number as described, for example, in U.S. Pat. No. 7,103,576 (U.S. patent application Ser. No. 09/956,997) incorporated herein by reference in its entirety. Accordingly, the features described in U.S. Pat. No. 7,103,576 may be used in conjunction with the features described herein.

FIG. 8 shows illustrative devices which might be used in the practice of the invention. For example, the DDN 0001I is associated with the internet browser 810 of the customer's computer. That is, when the customer (or a member of the customer's family) submits a transaction using the browser 810, the ATC, the DDN and the PAN is submitted in some suitable manner, such as by the user typing in such information and/or through use of a cookie on the customer's computer, for example. Alternatively, the customer might use a password protected applet 811 on the same physical computer to submit a transaction request associated with the DDN 002I. Each of these are considered a "device" having an associated device differentiator number (DDN), i.e., so the authenticating entity can determine which device was used. In turn, the authenticating entity can separately track (and separately report in a statement to the customer) transaction activity associated with the two devices 810, 811).

FIG. 8 also shows that the wife's credit card 812 is associated with the DDN 003; the husband's credit card 813 is associated with the DDN 004; the son's credit card 814 is associated with the DDN 005; and the son's key fob 815 is associated with the DDN 006. Thus, the authenticating entity can distinguish between purchases made by these respective devices.

Further, FIG. 8 shows that transactions may be submitted using the wife's cell phone, via devices 816 and 817. For example, the DDN 007 may be verbally conveyed by the wife in a telephone call, the PAN identified from the incoming cell phone number, and the ATC conveyed by the output of a suitable tone. The physical phone might also contain an RFID device, which is associated with a separate DDN (008).

Lastly, the DDN 009 is shown as associated with a dog's RFID device. Such device might be used when the dog is placed in a kennel, for example. The user could drop off and pick up the dog without ever dealing with any sign-in sheet or other administrative matter. Rather, the dog's presence would be tracked via interface with the RFID device 818.

It is appreciated that a wide variety of devices may be used. Each device may be associated with its own DDN. For example, an RFID device (with DDN) might be provided to interact with a gasoline filling station, such as an automobile, boat or personal watercraft filling station.

FIG. 8 also illustrates, as described above, that particular rules might be associated with particular DDNs, i.e., particular devices associated with the particular DDNs. For example, as shown, a rule set might be applied to the DDNs 005 and 006 to limit spending activity of a son.

FIG. 8 also shows that the form of the DDN may vary as desired. For example, the DDN 001I denotes, for example, that such DDN is associated with a device that is expected to effect Internet transactions. The dog's RFID device 818, on the other hand, is not expected to effect Internet transactions. Thus, an Internet transaction submitted using the PAN 802 with the DDN 009 would be flagged as potentially fraudulent.

In accordance with one embodiment of the invention, a customer may be provided with the ability to vary the rules associated with some or all of the DDNs associated with their PAN. In one embodiment, the user might vary the rules based on rule level. For example, all the devices (DDNs) of the customer personally might be considered to be at a first level. On the other hand, all the devices of the customer's son might be considered to be at a second level. Accordingly, the customer might collectively vary the rules at either the first or second level. For example, at the second level, the customer might collectively change all the son's devices (as identified by the authenticating entity using the DDNs) to have a maximum per day limit of $100 versus $50.

In accordance with one embodiment of the invention, the ability to uniquely identify a particular payment device (based on information submitted in the transaction request) allows the ability to segregate purchases associated with a particular PAN based on which payment device effected the particular purchase. That is, in a typical situation, several payment devices will be associated with a single PAN. The primary account holder (or a representative thereof) will typically receive a monthly statement of all the transactions associated with the particular PAN. The invention allows segregation of the transactions (in a statement) based on which payment device effected the transaction. This segregation may be performed in a variety of ways as desired. For example, all the transactions associated with all the primary account holders payment devices may be set out in one listing, while the transactions effected by the children's payment devices may be set out in a separate listing. The particular arrangement may be varied as desired. For example, if electronically viewed (such as over the Internet) various view options may be provided as desired. The various views may segregate the transactions (based on which payment device effected the transaction) in any manner desired. The user would then be provided suitable options to select which view the user wishes to review.

Various aspects of utilization of the device differentiator number are described above.

A further solution, in accordance with embodiments of the invention described herein, relate to novel processing of data that is more routinely secured in transactions. That is, the invention includes a method and system that keeps check of financial transactions by maintaining distinct records for a plurality of devices associated with a financial account, in conjunction with performing authentication, further to inputting transaction data from a point of sale. In one embodiment, the system may include a communication portion that inputs transaction data received from the point of sale. The transaction data may include an account number and one of a CVV number and an expiration date, for example. The system, such as the processing portion 210 in the transaction server 200 of FIG. 1 may further include a device identification portion 212 that identifies a particular device, from which the transaction originated, out of the plurality of devices. Such identification is based on the account number and one of the CVV number and the expiration date, for example. The system may also include an authentication portion that performs authentication processing based on a comparison process that utilizes the transaction data. The authentication portion generates and outputs an authentication result, i.e., an approval or denial of the transaction.

In particular, the device identification portion 212 may be provided with an algorithm or other processing mechanism that determines the particular card, or other device, the user is using (to perform the particular transaction). Such determination is performed based on data that is input from the point of sale (POS) and/or other data associated with the transaction. In particular, the device identification portion 212 determines the particular device used based on data that is currently routinely input in transactions, i.e., such as CVV number, CVV2 number, and/or expiration data., for example, hereinafter referred to "device data."

Accordingly, in processing of transaction data (for an input transaction), the device identification portion 212 inputs the transaction data for a particular transaction. The input transaction data includes the particular account number and the device data from the transaction, i.e., the "transaction device data." The device identification portion 212 then retrieves a particular customer's record (from the memory portion 230 for example) based on the input account number (in the transaction device data). The device identification portion 212 also retrieves the stored device data that is contained in the retrieved record. Such stored device data may be in the form of a "payment device record" as characterized herein, for example. In accordance with one embodiment of the invention, a particular customer's record may contain a number of payment device records. The stored device data includes the particular account number, and particulars of the customer devices, e.g. cards, that are associated with the account.

The particulars of the customer device might include the name of the device (e.g. card or transponder), CVV or CVV2 of the device, capabilities of the device (i.e., what type of transaction can the device perform), and/or other attributes of the device. The data in the stored device data may be associated with each other in some manner, i.e., mapped in some manner so as to provide the processing as described herein.

The device identification portion 212 performs an analysis based on the comparison of the transaction device data vis-à-vis the stored device data. For example, it may be the case that for the particular account number there are two customer cards and each of those customer cards have a respective CVV number. In accordance with one aspect of the invention, the CVV number may be stored in the magnetic strip of the card. In this case, the device identification portion 212 compares the CVV number received in the transaction with the two CVV numbers in the stored device data. Based on which CVV number matches, the device identification portion 212 may then map to (and identify) the particular device that is being utilized in the transaction.

As a result of identifying which device is being utilized, various other processing may then be performed. Such other processing might be in connection with authentication of the transaction, rules that apply to the particular device (e.g. card is identified as son's card that can't be used during a particular time window or at a particular merchant), fraud assessment and related processing and/or trend analysis, for example.

In addition to the processing described in the example above, the device identification portion 212 may perform various further processing to, in effect, deduce which device is being used in the particular transaction. For example, it may be the case that the particular account is associated with three cards, and that each of those cards possesses the same expiration date. Accordingly, the device identification portion 212 is not able to distinguish the devices apart based on the expiration date. However, it may be the case that the associated CVV number of each device is different and/or that the CVV2 number for each device is different (i.e., the CVV2 number being the number physically disposed on the back of the card/device). Thus, based on the comparison of the transaction device data (containing either the CVV or the CVV2) the device identification portion 212 may ascertain which device was used in the transaction.

Relatedly, for example, the expiration date for each of the two devices associated with an account number may well be different. In such case, the device identification portion 212 may utilize the account number and the expiration data, i.e., expiration date, alone to assess which device is being used in the transaction.

In general, the device identification portion 212 may use any attribute associated with the transaction, i.e., that is input with the transaction device data and/or any other data that is associated with the transaction (such as merchant, time of day, location, and/or channel for example), to assess which device is being used. For example, it may be the case that a transaction is input that may only have been performed by one of the customer devices. For example, this might be the case where the customer has a card and an RFID device associated with their account. In a situation, the device identification portion 212 may be able to ascertain that the transaction originated from a RFID communication. For example, the transaction may have been forwarded from a merchant that only processes RFID transactions. In such case, the device identification portion 212 may map to the particular record associated with the account, determine that only one customer device is capable of effecting the RFID transaction, and thus deduce the device that was used in the transaction. Various further processing may then be performed, such as applying any applicable rules for the particular device, fraud assessment, record keeping analysis, and/or other processing, for example.

For example, in an RFID transaction, if the device identification portion 212 ascertains that an input expiration date indeed matches one of the customer's devices, but that the matching customer device is not capable of effecting the RFID transaction, then the device identification portion 212 may tag such transaction as possibly fraudulent.

As described herein, the device identification portion 212 may utilize the uniqueness of attributes of customer devices to identify which device, of plural devices associated with a single account number, was used in a transaction. Relatedly, it may be beneficial to craft attributes of respective customer devices so as to be different. For example, two credit cards issued to husband and wife respectively, may be provided with different CVV numbers and/or different expiration dates so as to provide uniqueness to the cards. Such uniqueness may then be ascertained by the device identification portion 212.

Processing described above, in accordance with some embodiments of the invention, utilizes the expiration date. In accordance with one embodiment of the invention, such may be in the form of the expiration date that is disposed on the front of a credit card. However, the invention is not limited to such. In order to deduce which customer device was used in a transaction, the device identification portion 212 may use any expiration date that is contained in the customer device (and that is input with the transaction), and that might be compared with a stored expiration date. For example, a transponder device may include an expiration date (disposed in the physical transponder device) after which the transponder will not operate. This expiration date might be input with the transaction data, and compared with the expiration date stored in the transaction server 200. In a similar manner, "versions" that are associated with a particular customer device may be used by the device identification portion 212 to ascertain which device was used in a transaction. For example, the device identification portion 212 may be able to ascertain which version of software is disposed on a customer device based on the transaction data, and from such version identification, identify the particular device used.

Figure 9:
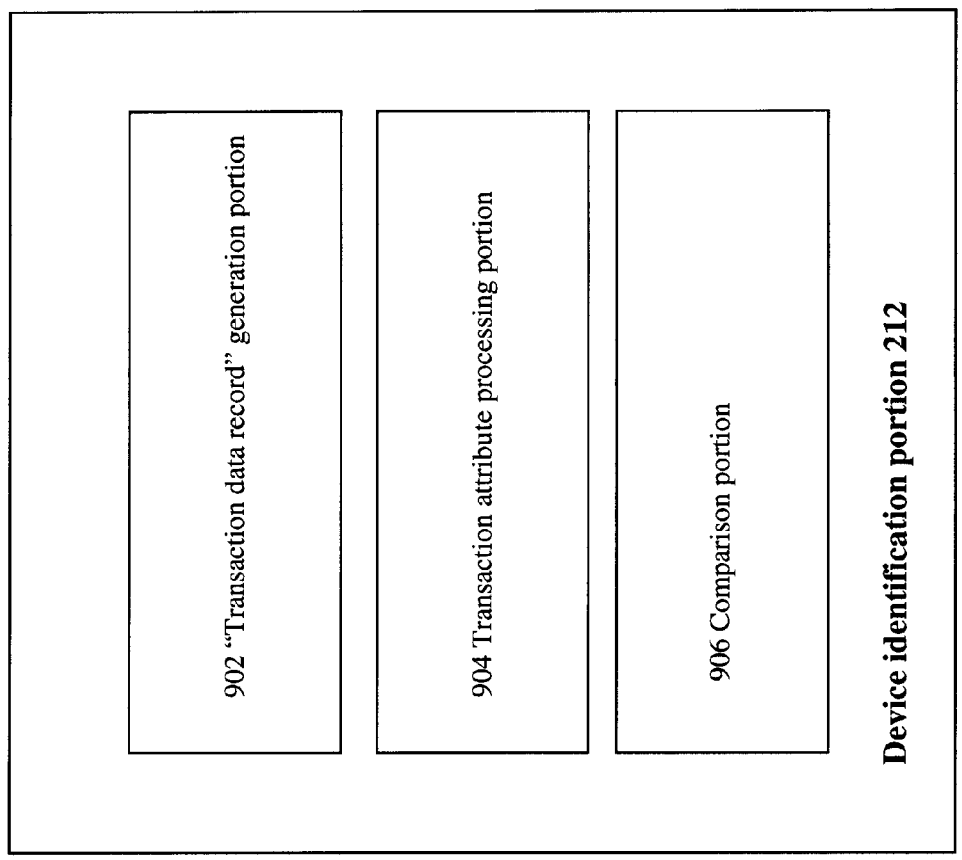
FIG. 9 is a block diagram showing in further detail the device identification portion in accordance with one embodiment of the invention.

In general, it is appreciated that various attributes of a particular device, that are input with the transaction data, may be used to identify the particular device used in a transaction request. The device identification portion 212 may distinguish a particular device based on one attribute or multiple attributes. The device identification portion 212 may sequentially proceed through comparison of the various input attributes (and/or other attributes associated with the transaction such as time of day, merchant, channel and/or geographical location) until there remains only one customer device that could satisfy the attributes that the device identification portion 212 observes in the transaction data. FIG. 9 is a block diagram showing in further detail the device identification portion 212 in accordance with one embodiment of the invention. As shown, the device identification portion 212 includes a transaction data record generation portion 902, and transaction attribute processing portion 904, and a comparison portion 906.

The processing portions (902, 904, 906) perform specialized processing not otherwise performed by the device identification portion 212. Specifically, the transaction data record generation portion 902 utilizes the data that is received for a requested transaction and, based on that data, generates a generated transaction data record 234. The transaction attribute processing portion 904 performs various processing related to attributes of the transaction data. The comparison portion 906 compares the transaction data record 234 (generated by the transaction data record generation portion 902) with stored payment device records 236. Based on this comparison, a payment device record 236 is retrieved corresponding to an identified device. Further operation of the processing portions (902, 904, 906) are described below.

FIG. 10 shows an attribute rank table 232 illustratively showing the rank of various attribute types, in accordance with one embodiment of the invention. It is appreciated that the particular attributes in the attribute rank table 232, as well as the respective ranking of those attributes, may be varied as desired. The attributes shown in FIG. 10 may illustratively include account number, CVV Number, CVV2 Number, payment device differentiator number, payment device expiration date, channel on which payment device is operable, version of software disposed on payment device, merchant types allowed, time of day allowed (which may be in the form of time windows, i.e., such as 7 am to 5 pm for example), locations allowed (which may be in the form of zip codes), history parameters (including frequency parameters), rewards points (or other point system) that are accumulated on the particular card, expiration date, and HASH values (i.e., a hash, hash value, hash code or hash sum that is generated based on a hash function using any of a wide variety of data, including for example the described attributes.) Various other attributes may be used as desired.

In accordance with one embodiment of the invention, the use of a particular attribute may be imposed such that the transaction server 200 will require such particular attribute to identify the device and/or to authorize the particular transaction. For example, any of the attributes in FIG. 10 may be so used in such manner. That is, a particular attribute may be provided on a particular payment device. The transaction server 200 then requires that particular attribute for identification of the device and/or authorization. In this manner, a particular payment device (e.g. a particular card) may essentially function as a special payment device in that a very specific piece of information is placed on the device for a very limited use, e.g. a HASH value is stored on a card for a one time transaction of $100,000. The transaction will then only be authorized if the authentication platform sees that HASH value in the requested transaction information. Various attributes and/or various number of attributes may be used as desired. Indeed, an attribute may be stored on a particular payment device that is not used or needed for normal common day transaction, but that will be required for a transaction satisfying particular criteria, e.g. when the card is used for the $100,000 transaction, the transaction server 200 will require that particular attribute. The particular attribute may be used to both identify the device and to authenticate the transaction.

With further reference to FIG. 10, it should be appreciated that the nature of attributes that are used in the processing may vary. That is, for example, some attributes may be constituted by information disposed on the device, and other attributes may be transaction type attributes, i.e., particulars of the specific transaction that is requested. Relatedly, it is appreciated that some attributes may indeed be used to uniquely identify a device in and of themselves, whereas other attributes may not uniquely identify the device in and of themselves.

FIG. 11 shows a generated transaction data record 234 in accordance with one embodiment of the invention. That is, as described further below, once transaction data is input for a requested transaction, the transaction data record generation portion 902 generates a generated transaction data record 234, such as illustratively shown in FIG. 11. To the extent it can, the transaction data record generation portion 902 allocates each attribute (i.e., each piece of data in the transaction data) to an attribute type. This allocation then prepares the data for comparison to the payment device record 236, i.e., to identify a payment device record that corresponds to the device used by the customer in the particular transaction being processed. Further details are described below.

FIG. 12 shows a payment device record 236 in accordance with one embodiment of the invention. In accordance with one embodiment of the invention, the payment device record 236 may be stored in the memory portion 230 of the transaction server 200. The payment device record 236, in accordance with one embodiment of the invention, corresponds to a single device used by a particular customer. Accordingly, the memory portion 230 may well contain thousands of payment device records 236. Further, there may be a number of payment device records 236 that correspond to a particular account, a particular account number, and/or a particular customer. As shown in FIG. 12, the payment device record 236 may contain various attribute types such as account number, CVV Number, CVV2 Number, payment device differentiator number, payment device expiration date, channel on which payment device is operable, version of software disposed on payment device, merchant types allowed time of day allowed (time windows), and/or locations allowed (zip code), for example. As described herein, the payment device records 236 are compared to a particular transaction data record 234 (generated for a requested transaction) so as to identify a single/unique payment device record that corresponds to the device used in the transaction. Further details are described below.

As shown in FIG. 10, "history parameters" including "frequency parameters" may be an attribute type. That is, in accordance with embodiments of the invention, the purchase history of a device may be saved and associated with such device. Such history may then be used by the transaction server 200 to either identify the particular device being used and/or afford fraud prevention. For example, an otherwise questionable transaction might be authorized if (based on the identified device) it resembles prior transactions in some manner. On the other hand, a transaction might be so at odds with prior history that such transaction would not be authorized, e.g. a sudden shift in geographical area in which the card is used. In another example, redundant purchases at a particular merchant (e.g. a gas station) may drive an adjustment to the particular rules (imposed by the transaction server 200) so as to require different authentication, e.g. more regimented authentication. Authentication as described herein may request any of a wide variety of differing information. Further, observed variance in any observed attribute may be used by the transaction server 200 to vary the manner in which the particular device is identified or vary the rules that are applied to the particular transaction.

Figure 13:
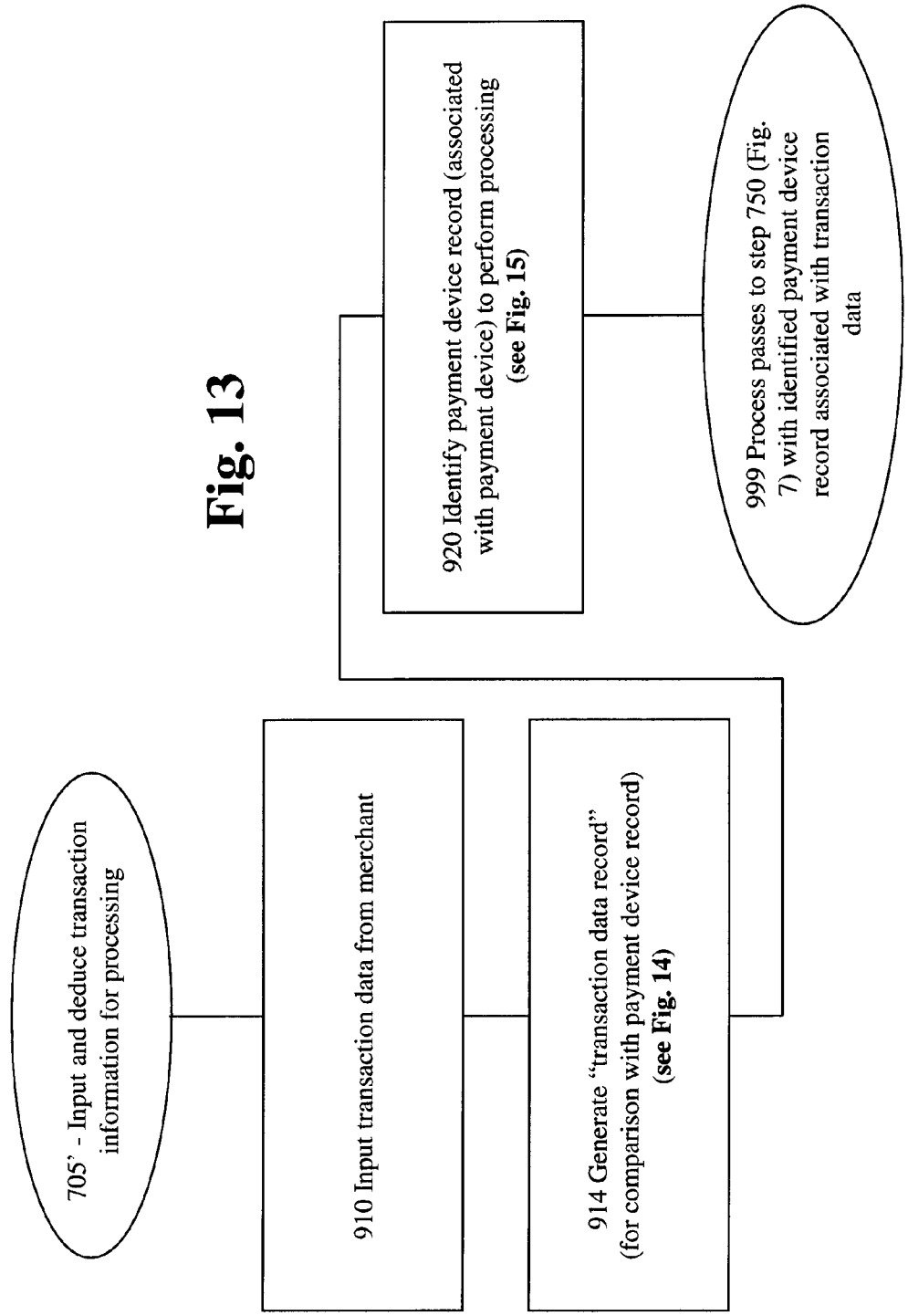
FIG. 13 is a flowchart showing details of processing in accordance with a different embodiment of the invention, as compared with that set forth in FIG. 7.

FIG. 13 is a flowchart showing details of processing of a step 705' in accordance with a different embodiment of the invention, as compared with that set forth in FIG. 7. In particular, the processing of step 705' performs processing to identify a particular customer device, which is used in a transaction, based on any of a variety of attributes. Such is in contrast to the processing of step 705 of FIG. 7 in which the device differentiator number was used in the identification of a customer device.

As shown in FIG. 13, the process starts in step 705' and passes to step 910. In step 910, the processing portion 210 receives input transaction data from a merchant, in accordance with one embodiment of the invention. Then, the process passes to step 914. In step 914, the transaction data record generation portion 902 (in the device identification portion 212) generates a transaction data record. The transaction data record is prepared for purposes of comparing with stored payment device records, and identifying a matching payment device record. Further details of step 914 are described below with reference to FIG. 14.

After step 914 of FIG. 13, the process passes to step 920. In step 920, the device identification portion 212 performs processing to identify a payment device record to use in processing the requested transaction. That is, the device identification portion 212 identifies a payment device record that corresponds to the customer device used in the transaction. Further details of step 920 are described below with reference to FIG. 15.

After step 920 of FIG. 13, the process passes to step 999. In step 999, the process passes to step 750 of FIG. 7. As further described below, in step 999 of the processing, the device identification portion 212 has identified a payment device record that corresponds to the customer device used in the transaction, i.e., a payment device record has been identified that corresponds to the generated transaction data record. Processing in step 750 proceeds as described above.

Figure 14:
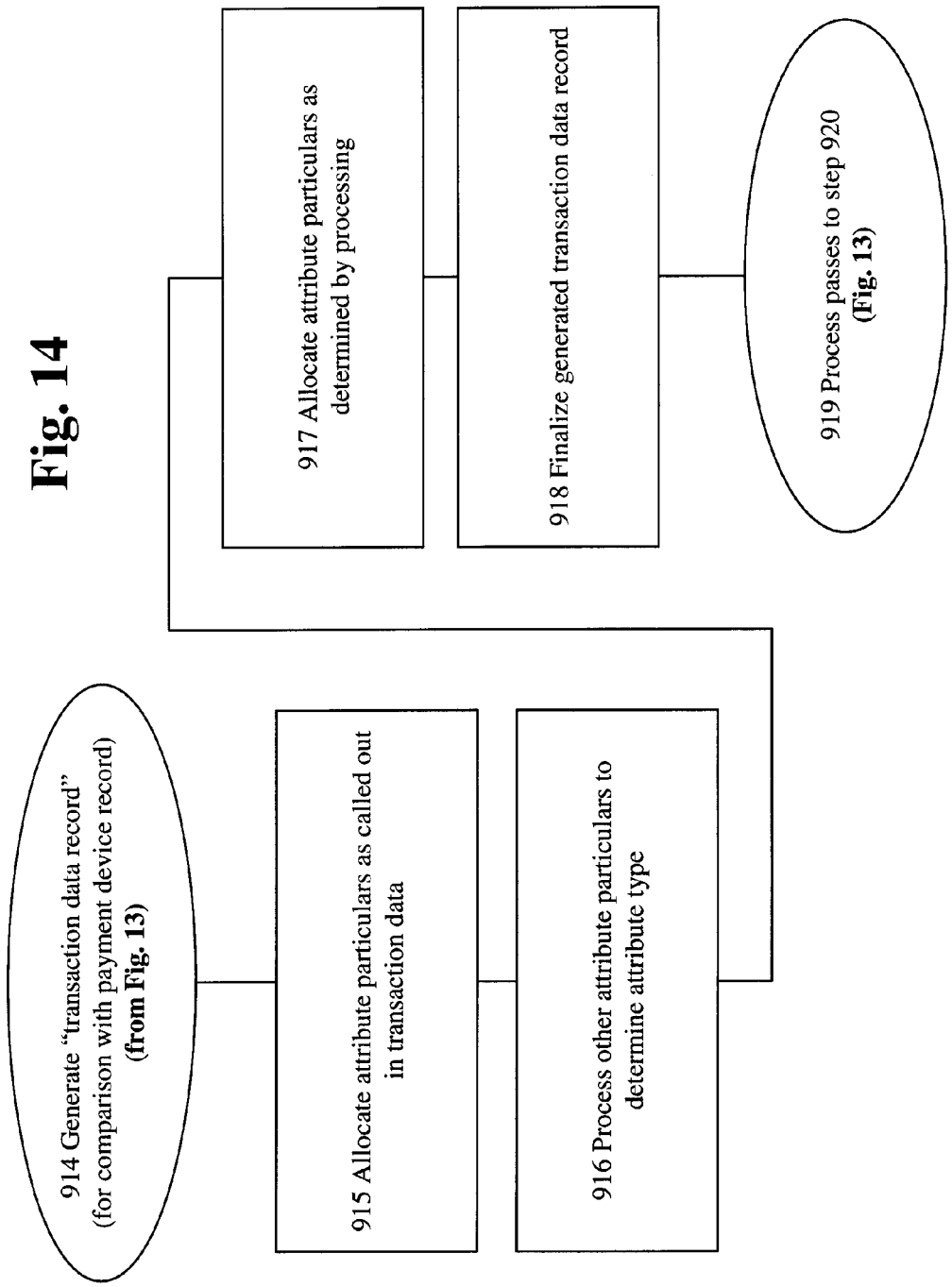
FIG. 14 is a flowchart showing in further detail the 'generate "transaction data record" to be used for comparison with payment device record' step of FIG. 13, in accordance with one embodiment of the invention.

FIG. 14 is a flowchart showing in further detail the 'generate "transaction data record" to be used for comparison with payment device record' step 914 of FIG. 13, in accordance with one embodiment of the invention. As shown in FIG. 14, the process starts in step 914 and passes to step 915. In step 915, the transaction data record generation portion 902 allocates attribute particulars as called out in the transaction data. That is, it is appreciated that certain attributes in received transaction data will be expressly called out as a certain type of attribute. For example, the transaction data may include data that is expressly delineated as an account number. However, other data may not be expressly called out as constituting a particular type of data. Accordingly, in step 916 of FIG. 14, the transaction data record generation portion 902 processes other attribute data to determine the attribute type of such attribute data.

Then in step 917, the transaction data record generation portion 902 allocates the attribute data, as determined by the processing of step 916, into cells or fields, for example, of the transaction data record. Features of the transaction data record are described above with reference to FIG. 12. After step 917, the process passes to step 918. In step 918, the transaction data record generation portion 902 finalizes the generated transaction data record.

Then, the process passes to step 919 of FIG. 14. In step 919, the process returns to step 920 of FIG. 13.

Figure 15:
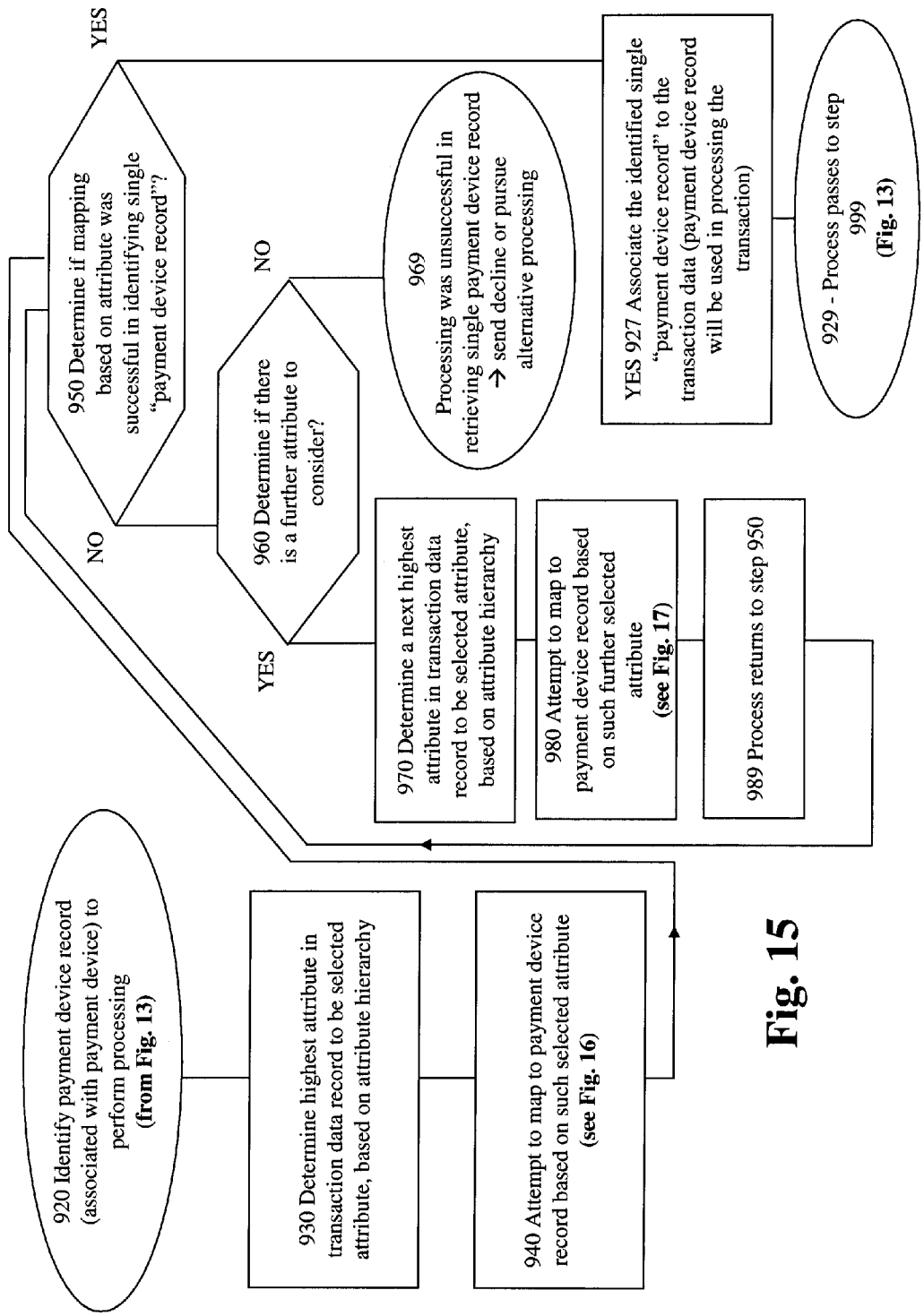
FIG. 15 is a flowchart showing the "identify payment device record (associated with payment device) to perform processing" step of FIG. 13, in accordance with one embodiment of the invention.

FIG. 15 is a flowchart showing the "identify payment device record (associated with payment device) to perform processing step 920 of FIG. 13, in accordance with one embodiment of the invention. As shown, the process starts in step 920 and passes to step 930. In step 930, the transaction attribute processing portion 904 (of the device identification portion 212) determines the highest attribute in the transaction data record to be the selected attribute, based on attribute hierarchy.

In accordance with one embodiment of the invention, the attribute hierarchy, i.e., the progression or order in which the transaction server 200 looks at the attributes (as described herein) may be dynamically varied. For example, the state of connectivity of the transaction server 200 (or other authentication/authentication platform) with a merchant system may be observed by the transaction server 200, and based on such observed state, the transaction server 200 adjusts the attribute hierarchy. Relatedly, it is appreciated that any rules in general that are applied to a particular transaction might be varied based on the connectivity of the transaction server 200 (or other authentication processor) with the merchant at which the transaction is being processed. The attribute hierarchy may also be dynamically varied based on other attributes or parameters such as the particular reader that is used at the point of sale to effect the transaction, the particular merchant, the particular network (e.g. VISA or MASTER CARD or AMERICAN EXPRESS), the particular private label card, the particular channel (online, RFID (radio frequency identification), swiped, or keyed), for example.

After step 930 of FIG. 15, the process passes to step 940. In step 940, the transaction attribute processing portion 904 attempts to map to a payment device record based on the selected attribute. Further details of the processing of step 940 are described below with reference to FIG. 16, in accordance with one embodiment of the invention.

As shown in FIG. 15, after step 940, the process passes to step 950. In step 950, the transaction attribute processing portion 904 determines if mapping, based on the selected attribute, was successful in identifying a single payment device record. That is, was the comparison successful in mapping to a single (i.e., unique) payment device record, If NO, i.e., the transaction attribute processing portion 904 could not map into a single payment device record based on the attribute being considered, then further processing is needed to identify the single payment device record. Accordingly, the process of FIG. 15 passes to step 960.

In step 960 of FIG. 15, the transaction attribute processing portion 904 determines if there is a further attribute which may be processed to determine a single payment device record, i.e., to determine the payment device record that was used in the particular transaction. If NO in step 960, i.e., there is not a further attribute for the transaction attribute processing portion 904 to process in order to determine the single payment device record, then the process passes to step 969.

Step 969 of FIG. 15 reflects that the processing described by the device identification portion 212 was not successful in determining a unique payment device record that corresponds to the transaction data. Accordingly, in the case that the process reaches step 969, then alternative processing must be performed. For example, the requested transaction may be terminated and an appropriate message forwarded to the customer—such as "transaction declined." Alternatively, some other alternative processing may be performed.

On the other hand with further reference to step 960, if in step 960 the transaction attribute processing portion 904 determines that "YES" there is a further attribute to consider, then the process passes to step 970. In step 970 of FIG. 15, the transaction attribute processing portion 904 determines the next highest attribute in the transaction data record to be a further selected attribute, based on attribute hierarchy.

Then, the process passes to step 980 of FIG. 15. In step 980, the transaction attribute processing portion 904 again attempts to map to a single payment device record. Further details of the processing of step 980 are described below with reference to FIG. 17.

After step 980 in FIG. 15, the process passes to step 989. In step 989, the process returns to step 950 of FIG. 15. The transaction attribute processing portion 904 then again determines whether mapping based on the further attribute was successful in identifying a single payment device record. If NO in step 950, then processing then proceeds as described above.

However, it may be the case in step 950 that the transaction attribute processing portion 904 determines that indeed the mapping was successful in identifying a single payment device record, i.e., a unique payment device record that corresponds with the transaction being processed and thus serves to identify the device used in the transaction. Accordingly, if YES in step 950, then the process passes to step 927 of FIG. 15.

In step 927, the transaction attribute processing portion 904 associates the identified single "payment device record" to the transaction data. Accordingly, such payment device record is then used in processing the transaction. That is, the process then passes to step 929 of FIG. 15. In step 929, the processing returns to step 999 of FIG. 13. Therein, the processing passes onto step 750 of FIG. 7, with the identified payment device record associated with transaction data.

FIG. 16 is a flowchart showing in further detail the "attempt to map to a payment device record based on the selected attribute" step 940 of FIG. 15, in accordance with one embodiment of the invention. As shown, the process starts in step 940 and passes to step 942.

In step 942 of FIG. 16, the comparison portion 906 (in the device identification portion 212) compares the selected attribute with a corresponding attribute in the payment device records in database. For example, if the selected attribute is the account number, then the comparison portion 906 compares that account number with the account number attribute in the payment device records, which are stored in the memory portion 230 for example. It is appreciated that there may well be thousands of payment device records stored in the memory portion 230. It is further appreciated that any of a variety of search and/or comparison techniques may be used by the comparison portion 906 in order to secure a matching payment device record.

After step 942 of FIG. 16, the process passes to step 944. In step 944, the comparison portion 906 generates a payment device record subset. Such payment device record is composed of payment device records that satisfy the comparison that was performed in step 942. Indeed, it may be, for example, that the payment device record subset (determined in step 944) includes two or three payment device records that correspond to the customer (requesting the transaction). Such identified payment device records might correspond to the same account number of the customer, but correspond to respective devices of that customer, for example. Accordingly, the processing of step 980 described below further identifies which device is actually being used by the customer.

After step 944 of FIG. 16, the process passes to step 946. In step 946, the process passes to step 950 of FIG. 15. Processing then proceeds as described above.

FIG. 17 is a flowchart showing the "attempt to map to payment device record based on such further selected attribute" step 980 of FIG. 15, in accordance with one embodiment of the invention. The processing of FIG. 17 is similar in nature to the processing of FIG. 16, but with a further selected attribute and other variances. The process of FIG. 17 starts in step 980 and passes to step 982.

In step 982 of FIG. 17, the comparison portion 906 compares the further selected attribute, of the generated transaction data record, with the corresponding attributes in the various payment device records in the payment device record subset. That is, the comparison is performed against all the payment device records in the payment device record subset generated in step 944 of FIG. 16. The payment device record subset may further have been limited by any previous invocation of the processing of FIG. 17.

Accordingly, in step 983 of FIG. 17, the comparison portion 906 generates a further limited payment device record subset (composed of payment device records that also satisfy the further comparison of step 982 of FIG. 17).

After step 983, the process passes to step 984 of FIG. 17, in accordance with one embodiment of the invention. In step 984, the process passes to step 989 of FIG. 15. Therein, the process passes again to step 950 of FIG. 15.

In step 950, the transaction attribute processing portion 904 determines if the mapping, i.e., the comparison processing of FIG. 17, based on the further attribute was successful in identifying a single payment device record, i.e., a unique payment record. If it was, then the process passes to step 927 as described above.

As described herein, various processing is performed by a transaction server 200. However, in accordance with some embodiments of the invention, it is appreciated that the various processing described herein may be performed by a variety of processing components that are disposed in different arrangements. For example, various processing performed by the transaction server 200 including identifying the particular device utilized in a transaction and authentication of such transaction, might be performed by a processing component disposed at a merchant location, e.g. in the form of a merchant terminal that is provided with processing capability to perform the desired processing. That is, in such arrangement, identification of the particular device and authorization for the transaction could be performed at the merchant, i.e., thus providing authorization for the transaction without communication over a network.

It is appreciated that the features described herein may be used in conjunction with a "rewards program" or other promotional programs. For example, benefits from such programs might be attained by use of a particular identified device or particular accounts linked to particular devices, for example.

Alternatively, if a single payment device record has not yet been identified, then processing will continue, as described above, iteratively invoking the processing of step 980 and FIG. 17 and/or until there are no more attributes to consider (resulting in step 969).

FIG. 1 above describes processing in the context of a transponder. However, it is appreciated that other devices may be used instead of the described transponder. In general, processing is described herein in conjunction with illustrative consumer devices such as a transponder and phone. It is appreciated that particular processing described herein in conjunction with one type of customer device may instead be performed by any other customer device, limited only by the processing, communication and other capabilities of such other customer device.

Further, processing is described herein in conjunction with illustrative customer cards and/or accounts, i.e., a device and/or an account that represents monetary value and that is associated with the consumer. It is appreciated that particular processing described herein in conjunction with one type of card/account may be instead performed by any other card/account, limited only by the capabilities of such other card/account.

Hereinafter aspects of implementation will be described.

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-PackardUX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A system that keeps check of financial transactions by maintaining a count of financial transactions conducted by each of a plurality of payment devices that are associated with an account, each payment device having attributes including at least one of (1) a CVV number that differs from other CVV numbers for the other payment devices associated with the account and (2) an expiration date that differs from other expiration dates for the other payment devices associated with the account, the system comprising:
   a communication portion that receives transaction data, the transaction data including an account number, an input transaction count value and at least one attribute of a payment device used to conduct the transaction;
   a processing portion, in the form of a tangibly embodied computer processor, that processes the transaction data, the processing portion including:

a memory portion that stores stored data;
a payment device identification portion that identifies the payment device used to conduct the transaction out of the plurality of payment devices based on the attributes;
a register portion that maintains a count of financial transactions so as to provide a current transaction count value associated with the payment device, the register portion maintaining current transaction count values for the plurality of payment devices;
an authentication portion that performs authentication processing based on a comparison process that utilizes the current transaction count value and the input transaction count value, the authentication portion generating an authentication result, the authentication portion outputting the authentication result; and
the authentication portion outputting the authentication result to a point of sale device.

2. The system of claim 1, wherein the payment device identification portion that identifies the payment device based on the other attributes by:
comparing the other attributes in the transaction data with stored attributes, the stored attributes being associated with the payment device; and
based on the comparison, identifying the payment device that was used to conduct the transaction.

3. The system of claim 2, wherein the step of comparing the other attributes in the transaction data with stored attributes comprises:
using a sequence of the other attributes, progressively comparing an other attribute to the stored attributes;
determining the sequence based on a hierarchy of attributes; and
progressively comparing a single other attribute, to the stored attributes, in an iterative manner, based on the sequence, until the device is determined.

4. The system of claim 3, wherein the identification of the device includes the determination of a payment device record that corresponds to the device.

5. The system of claim 3, wherein a top ranked attribute in the hierarchy of attributes includes the account number, such top ranked attribute constituted by being ranked first.

6. The system of claim 3, wherein the hierarchy of attributes includes at least one of the account number, the CVV number and the expiration date of the payment device.

7. The system of claim 3, wherein the hierarchy of attributes includes each of the account number, the CVV number and the expiration date of the payment device.

8. The system of claim 3, wherein the payment device identification portion, in the progressively comparing a single other attribute to the stored attributes:
generates a transaction data record, based on the transaction data; and
compares attributes in the transaction data record with previously stored payment device records.

9. The system of claim 3, wherein one of the stored attributes is constituted by a hash value disposed on the payment device.

10. The system of claim 3, wherein a stored attribute is constituted by history information associated with the payment device that relates to past use of the device.

11. The system of claim 3, wherein the payment device identification portion varies the hierarchy of attributes.

12. The system of claim 11, wherein the payment device identification portion varies the hierarchy of attributes based on attributes associated with the transaction.

13. The system of claim 12, wherein the payment device identification portion varies the hierarchy of attributes based on connectivity with the merchant that is associated with the transaction.

14. The system of claim 1, in which the payment device is a transponder.

15. The system of claim 1, in which the payment device is a RFID device.

16. The system of claim 1, in which the system includes the point of sale device.

17. A system that keeps check of financial transactions by maintaining a count of the financial transactions conducted by each of a plurality of payment devices that are associated with an account comprising:
a communication portion that receives transaction data, the transaction data including an account number, an input transaction count value and attributes of the transaction;
a processing portion, in the form of a tangibly embodied computer processor, that processes the transaction data, the processing portion including:
a memory portion that stores stored data;
a payment device identification portion that identifies the device used to conduct the transaction out of the plurality of payment devices based on the attributes;
a register portion that maintains a count of financial transactions so as to provide a current transaction count value associated with the payment device, the register portion maintaining current transaction count values for the plurality of payment devices that are associated with a single financial account;
an authentication portion that performs authentication processing based on a comparison process that utilizes the current transaction count value and the input transaction count value, the authentication portion generating an authentication result, the authentication portion outputting the authentication result; and
the authentication portion outputting the authentication result to a point of sale device; and
wherein the payment device identification portion:
compares the other attributes in the transaction data with stored attributes, the stored attributes being associated with the payment device by:
utilizing a sequence of attributes, of the other attributes, to progressively compare an other attribute to the stored attributes;
determining the sequence based on a hierarchy of attributes; and
progressively comparing a single other attribute, to the stored attributes, in an iterative manner, based on the sequence, the comparing being performed until the payment device is determined; and
based on the comparison, identifies the payment device, out of the plurality of payment devices that are associated with the single financial account, that was used by the customer to effect the transaction.

18. A method to keep check of financial transactions by maintaining a count of the financial transactions conducted by each of a plurality of payment devices that are associated with an account, the method performed by a tangibly embodied computer processor, comprising:
receiving from the payment device, by the tangibly embodied computer processor, transaction data received from the data bearing record in the payment device, the transaction data including an account number, an input transaction count value and at least one attribute associated with the transaction;

identifying, by the tangibly embodied computer processor, the payment device used to conduct the transaction out of the plurality of payment devices based on the at least one attribute and the account number by:
- utilizing a sequence of attributes to progressively compare attributes to stored attributes;
- determining the sequence based on a hierarchy of attributes; and
- progressively comparing a single other attribute, to the stored attributes, in an iterative manner, based on the sequence, the comparing being performed until the payment device is determined;

maintaining, by a register portion of the tangibly embodied computer processor, a count of financial transactions so as to provide a current transaction count value associated with an input device differentiator number for the account number, the register portion maintaining current transaction count values for the plurality of payment devices;

performing, by the tangibly embodied computer processor, authentication processing based on a comparison process that utilizes the current transaction count value and the input transaction count value; and generating, by the tangibly embodied computer processor, and outputting, by the tangibly embodied computer processor, an authentication result, based on the authentication processing; and utilizing, by the tangibly embodied computer processor, a sequence of attributes, of the other attributes, to progressively compare an other attribute to the stored attributes.

* * * * *